United States Patent
Gaspard, II et al.

(10) Patent No.: US 6,336,676 B2
(45) Date of Patent: *Jan. 8, 2002

(54) PASSENGER AND FREIGHT CARRYING VEHICLE

(75) Inventors: James G. Gaspard, II, Golden, CO (US); Harvey F. Dick, Heflin, AL (US)

(73) Assignee: IAP Intermodal, LLC, Lamar, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/769,849

(22) Filed: Jan. 25, 2001

Related U.S. Application Data

(63) Continuation of application No. 09/634,326, filed on Aug. 7, 2000
(60) Provisional application No. 60/154,889, filed on Sep. 20, 1999.

(51) Int. Cl.$^7$ ................. B60J 1/00; B60J 7/00; B60K 37/00; B60N 2/00; B60N 3/00
(52) U.S. Cl. ............ 296/178; 296/183; 410/82
(58) Field of Search ............... 296/178, 183; 410/82

(56) References Cited

U.S. PATENT DOCUMENTS

| | | | |
|---|---|---|---|
| 1,654,492 A | * | 12/1927 | Corbin, Jr. |
| 2,490,162 A | * | 12/1949 | Ruelle |
| 3,317,236 A | * | 5/1967 | Connerat et al. |
| 3,989,119 A | * | 11/1976 | Cady |
| 4,195,856 A | * | 4/1980 | Larson et al. |
| 4,320,811 A | * | 3/1982 | Queveav |
| 4,397,496 A | * | 8/1983 | Drygas, Jr. |
| 4,582,354 A | * | 4/1986 | Halim |
| 4,684,142 A | * | 8/1987 | Christenson |
| 5,562,374 A | | 10/1996 | Plamper |
| 5,863,070 A | * | 1/1999 | Williams et al. |
| 5,893,692 A | * | 4/1999 | Asanuma |
| 5,934,739 A | | 8/1999 | Waldeck |
| 5,947,550 A | * | 9/1999 | Mehren et al. |

OTHER PUBLICATIONS

Wirbitzky, "Neoplan Double–Decker Buses," 1980, pp. 162 & 163, published by Neoplan—Gottlob Auwarter GMBH + Co. in West–Germany.

Muller, Intermodal Freight Transportation, 4th Edition, 1999, published jointly by the Eno Transportation Foundation and the Intermodal Association of North America in Washington, D.C.

"Eno Transportation Foundation, Inc. News," May 1999, pp. 1–8, published by the Eno Transportation Foundation in Washington, D.C.

* cited by examiner

*Primary Examiner*—Joseph D. Pape
*Assistant Examiner*—Scott Carpenter
(74) *Attorney, Agent, or Firm*—Dorr, Carson, Sloan & Birney, P.C.

(57) ABSTRACT

A vehicle having a passenger area and a freight area to transport passengers and freight, including an intermodal container. The vehicle is supported by a truck frame connected to a coach spine in a three-dimensional region so that forces from a load on the freight area are distributed over the three-dimensional region and into the passenger area. The vehicle preferably also includes a retractable axle to increase the vehicle's freight hauling capacity. An engine under the rear portion of the freight area is preferably disposed between a forward region defined by a ground clearance height and a vehicle height and a rearward region defined by the departure angle and the vehicle height. The vehicle's suspension system ensures a comfortable ride for passengers under various loading conditions.

49 Claims, 17 Drawing Sheets

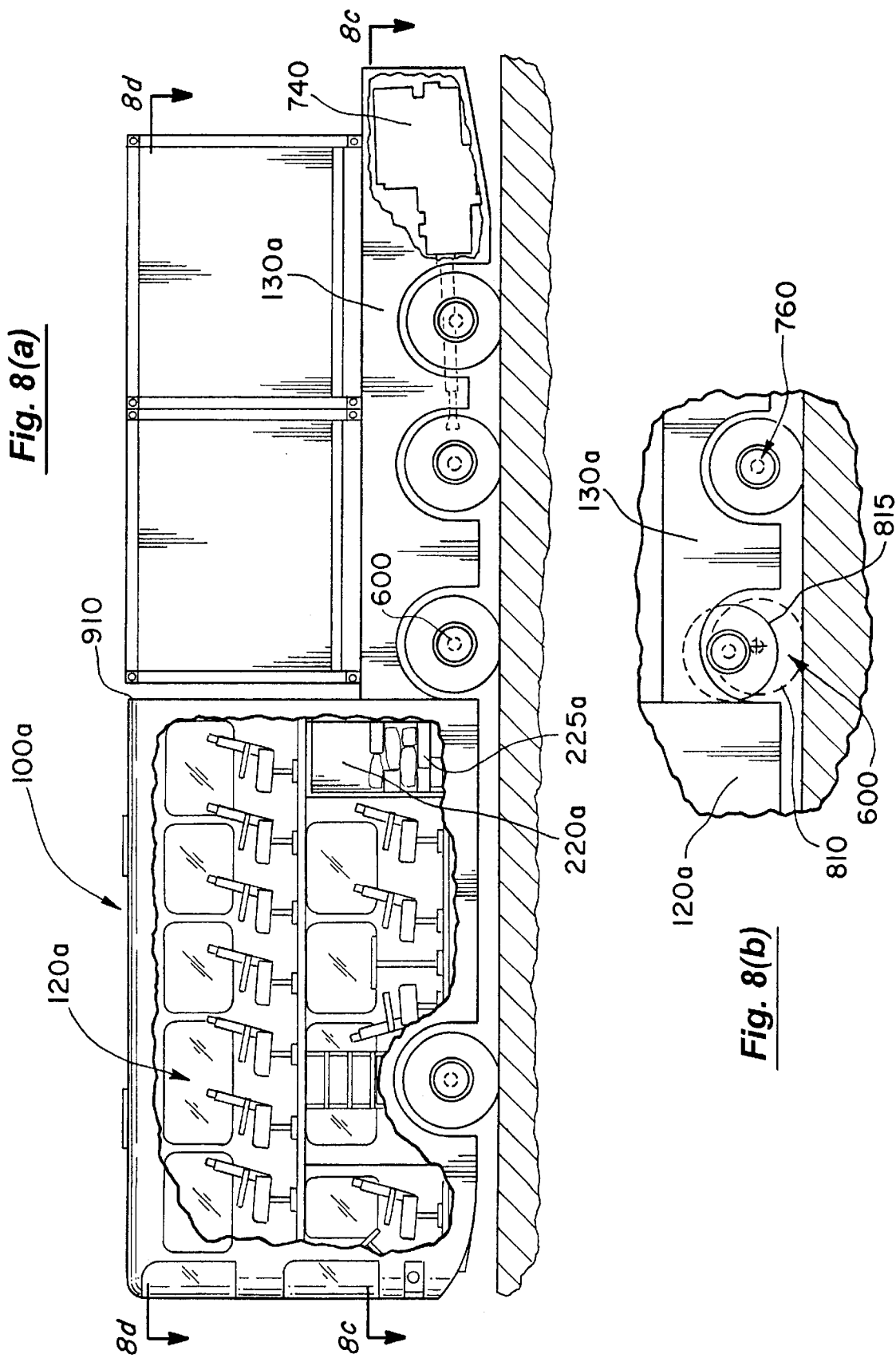

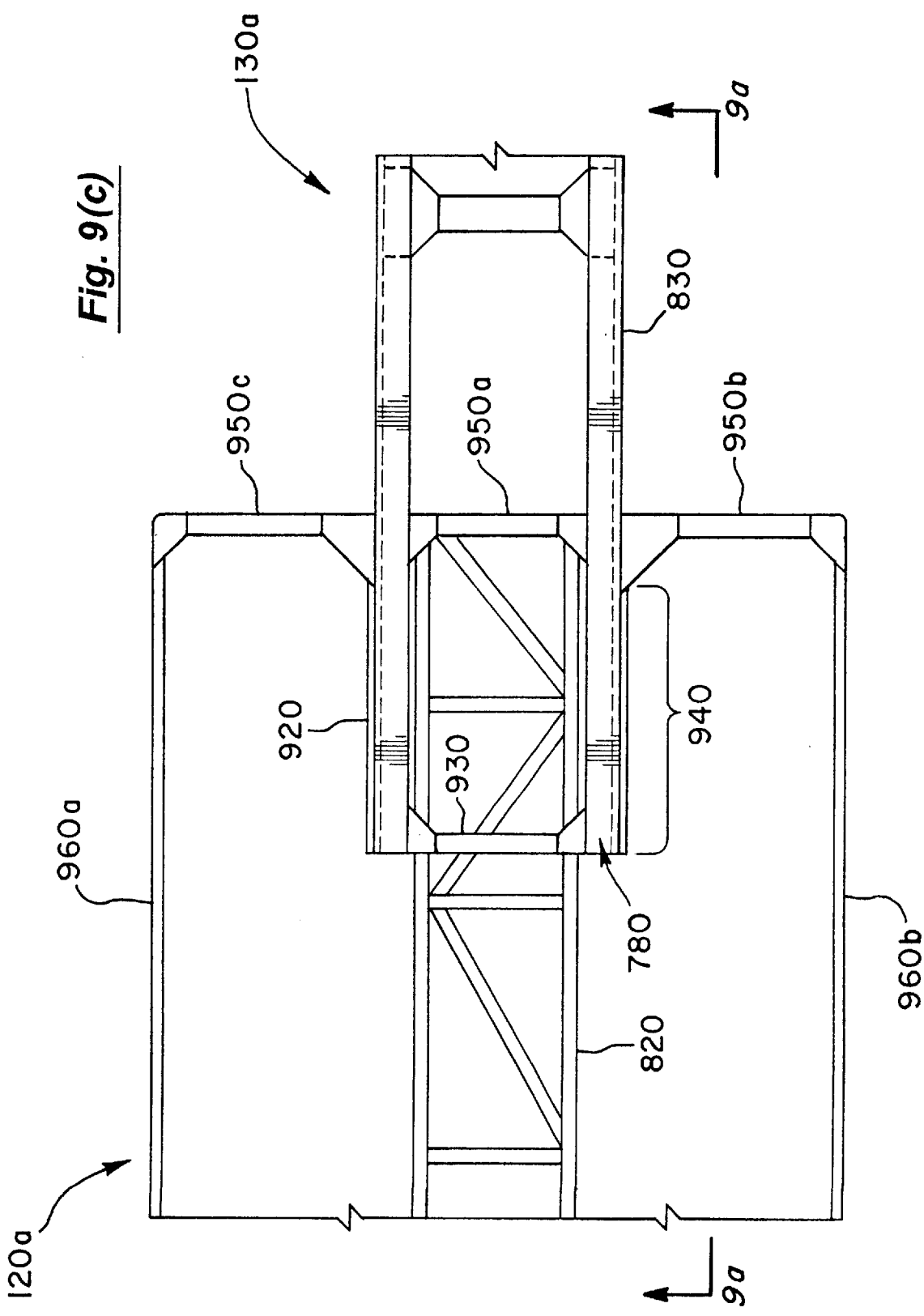

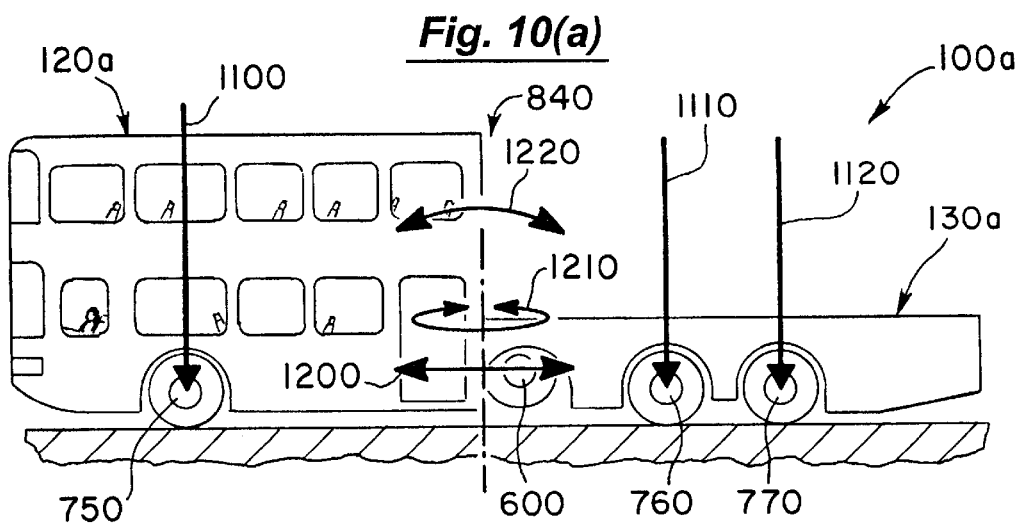
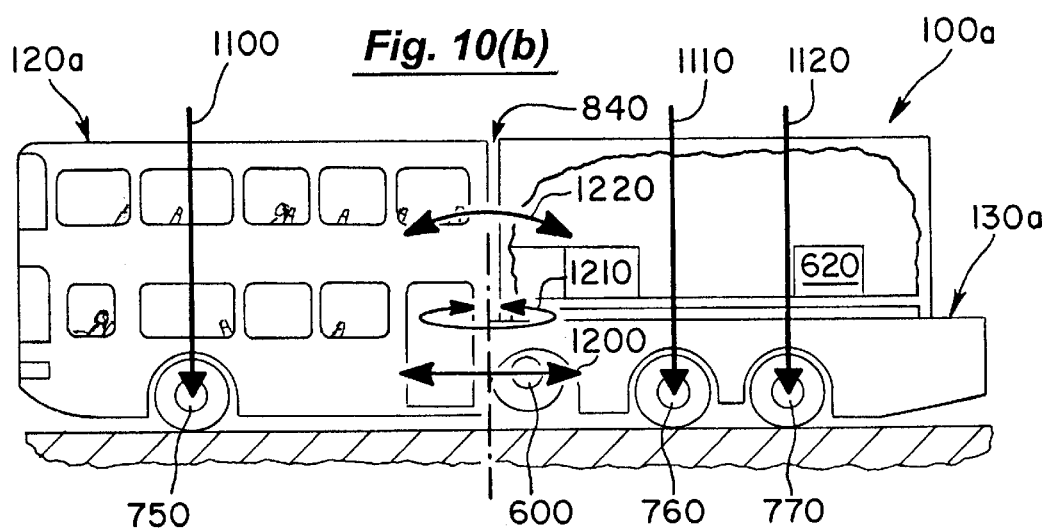
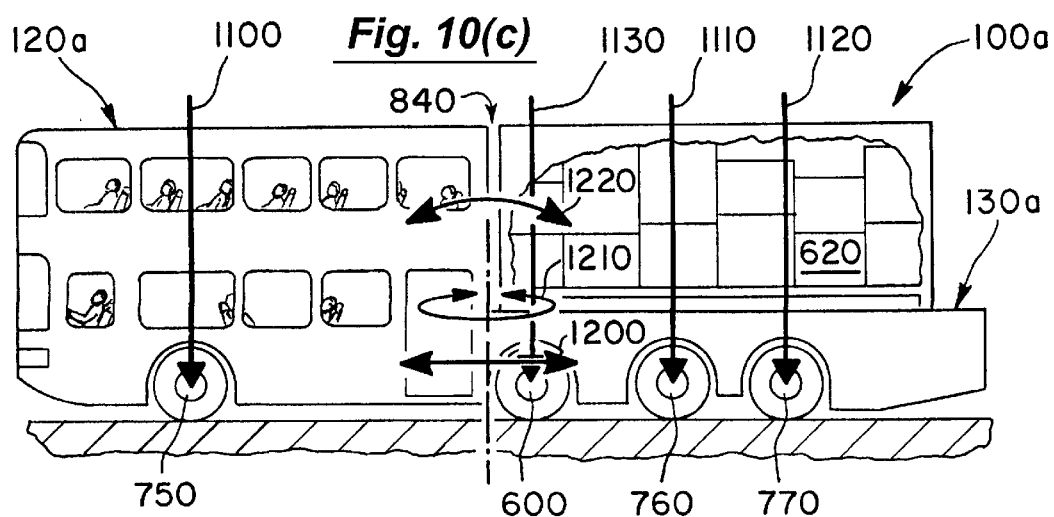

PASSENGER AND FREIGHT CARRYING VEHICLE

RELATED APPLICATION

This application claims priority, to and is a continuation of Ser. No. 09/634,326 entitled "PASSENGER AND FREIGHT CARRYING VEHICLE," filed on Aug. 7, 2000 and which claims the benefit under 35 U.S.C. § 119(e) of U.S. Provisional Application Ser. No. 60/154,889 filed on Sep. 20, 1999, entitled INTERMODAL COACH.

BACKGROUND OF THE INVENTION

1. Field of the Invention

The present invention relates generally to both the fields of ground transportation of passengers and ground transportation of freight.

2. Statement of the Problem

The adoption of uniform standards for containers in 1968 by the International Standards Organization (ISO) precipitated a rapid growth of the containerized freight industry. Shipping companies quickly recognized the advantages of intermodal containers as opposed to traditional break-bulk transportation of cargo. Traditionally, break-bulk transportation required the cargo to be packaged and repackaged in-route (e.g., from truck trailer to rail car to ship). Containerization on the other hand, permits cargo to move from a point of origin to a final destination in a single intermodal container, thus reducing costs, shipping time, and minimizing customs formalities. The same container can be carried successively by ship, by rail car, and by truck. In addition, break-bulk transportation continues to play a major role in the freight industry.

Although passenger coaches travel many of the same routes as trains and trucks, and indeed even service some routes not regularly serviced by trucks or trains, the currently structured coach industry does not significantly participate in the freight market. Although the currently structured coach industry can haul limited loads (e.g., small, lightweight packages on some routes) along with passengers, it is not currently equipped to significantly enter the freight market while still serving passengers.

In addition, some routes serviced by coaches become unprofitable as the cost of servicing the route exceeds passenger demand, thereby reducing the mobility of people living in these isolated or outlying areas that are unable to afford private transportation (e.g., some elderly, disabled, and economically disadvantaged residents). Likewise, congestion in many urban areas is also becoming an ever increasing problem and operating separate coaches and freight trucks in these areas increases the congestion and associated pollution.

Therefore, to serve the transportation needs of outlying communities and congested urban areas and participating in the freight market, the following needs exist in the coach industry:

1. to transport containerized freight while simultaneously transporting passengers;
2. to provide a chassis that supports both a passenger area and a freight area.
3. to provide a comfortable and quiet passenger area adjacent a freight area;
4. to arrange the wheels and axles of the vehicle to support various loading conditions, and to provide traction, maximize fuel efficiency, and minimize tire wear;
5. to provide a suspension system that supports freight while maintaining the comfort and quiet of the ride for passengers;
6. to interconnect the frame supporting the passenger area with the frame supporting the freight area in such a way that the stress and forces are transferred throughout the vehicle;
7. to distribute the forces acting on the vehicle from both the passenger area and the freight loaded thereon under various passenger and freight loading conditions;
8. to position the engine in such a way that minimum ground clearances are maintained while maximizing the height of the freight that can be loaded onto the freight area;
9. to improve the profitability of existing routes by hauling freight in addition to passengers;
10. to expand market share in the coach industry by adding new routes;
11. to combine both freight and passenger service, especially in heavily congested areas;
12. to aggressively price passenger tickets by supplementing passenger fares with freight transportation fees;
13. to provide a flexible vehicle (i.e., one that can be used in different freight markets with little or no modification to the vehicle).

The prior art does not address these concerns. For example, Wirbitzky, *NEOPLAN, double-decker buses*, pp. 162–163 (1980), shows a test bus having a passenger compartment and a container for shuttle service between two NEOPLAN assembly plants. The test bus was designed to test suspension by placing a load on the back. The freight container, while removable, is not the standardized intermodal container discussed above that can be used interchangeably between other modes of transportation (e.g., train, ship, and truck). The test bus was constructed using a Spaceliner (a proprietary design of Neoplan Germany) and not a double-decker coach. A Spaceliner is a coach featuring a raised full length passenger level above a lowered driver, baggage, galley, and lavatory area. In addition, wheel and axle numbers and arrangements that would support the vehicle under various loading conditions are not shown nor discussed. No details are given with respect to the frame or frames supporting the vehicle, the suspension, or other structural details. Nor are any examples of use given, such as expanding market share in both passenger and freight markets, adding new routes, scheduling the simultaneous transportation of freight and passengers, etc.

SUMMARY OF THE INVENTION

1. Solution to the Problem. This invention provides a vehicle capable of simultaneously transporting freight and passengers. The freight area is designed so that the vehicle can transport standard intermodal containers. As such, the cargo can be readily interchanged with other modes of transportation (e.g., ship, railcar, truck, etc.). The chassis of the present invention provides the requisite strength and associated structure to support both a passenger area and freight loaded thereon. The passenger area is designed to provide passenger comfort and safety. That is, the passenger and freight areas are preferably dimensioned to reduce wind resistance and the rear wall of the passenger area is reinforced. The axles and corresponding wheels are arranged so that the vehicle can carry significant volumes of freight, as well as smaller volumes on a frequent basis. A retractable axle can be lowered to support a larger load or raised with smaller loads to increase fuel efficiency and reduce tire wear. The suspension system provides a consistently comfortable ride for passengers under various passenger and/or freight loadings. A truck frame and a coach spine are interconnected in a three-dimensional region to provide the strength (i.e., distribute stresses and forces throughout the vehicle) and durability to simultaneously haul freight and comfortably transport passengers. The forces acting on the vehicle from both the passenger area and the freight loaded thereon are distributed so that the vehicle meets or exceeds transportation safety and structural standards under various loading conditions. The engine is disposed in the rear of the vehicle in such a way that minimum ground clearances are maintained and the height of the freight loaded onto the vehicle is maximized.

In addition, the vehicle transports both passengers and freight, thus increasing the profitability of existing routes (i.e., the transport of freight provides a guaranteed source of income regardless of the number of passengers, if any). The vehicle also makes it possible to expand market share by adding new routes, especially in rural or outlying areas not currently serviced by mass transportation. Likewise, the vehicle combines both freight and passenger service, reducing congestion in heavily populated areas. The vehicle permits passenger fares to be supplemented with freight transportation fees so that passenger tickets can be aggressively priced. The vehicle can carry different types of freight (e.g., rural mail service, inter-city expedited freight, and secure and direct auto delivery, etc.) and different quantities of freight to many areas (e.g., freight staging areas, warehouses, direct delivery, airports, etc.) with little or no modification to the vehicle itself, making it a flexible vehicle for use in many freight markets.

2. Summary. The vehicle of the present invention has both a forward double-decker passenger area and a flatbed area preferably extending rearward from the passenger area. A coach chassis, having a coach spine connected to a truck frame in a three-dimensional region, supports both the passenger area and the flatbed area and provides the passengers with a gentle, comfortable ride while the vehicle is loaded to varying degrees with freight (e.g., an intermodal container loaded and secured to the flatbed or freight area). In addition, the freight is preferably loaded onto the flatbed or freight area so that the top of the passenger area is flush with the freight and the sides of the freight are inset from the sides of the passenger area, thus reducing wind resistance and further providing the passengers with a quiet, comfortable ride. Attachments or connectors (e.g., at each corner of the flatbed area) can be used to removably secure the freight (e.g., an intermodal container) to the flatbed area of the intermodal coach.

The truck frame is connected at least to the coach spine and preferably also connected in a three-dimensional region to the passenger area. Specifically, the coach spine extends beneath and to the rear wall of the passenger area while the truck frame extends beneath the freight area and through the passenger area rear wall and overlaps the coach spine. The truck frame is connected to the coach spine along the overlap by a plate. The passenger and freight areas are further integrally connected in the three-dimensional region by a series of support members. In a preferred embodiment, a first cross member extends across the front portion of the truck frame and connects the coach spine to the truck frame, and a three-part cross member connects the coach spine to the truck frame and to the rear and side walls of the passenger area. Rear support members are connected to the truck frame at the rear wall and extend vertically upward therefrom to connect at the second level of the passenger area. Front support members are connected to the truck frame at the first cross member and extend vertically upward therefrom to connect at the second level of the passenger area. Furthermore, a first diagonal support member is connected to the truck frame at the first cross member and extends diagonally upward therefrom to connect at the second level above the second cross member. A second diagonal support member is connected to the truck frame at the second cross member and extends diagonally upward therefrom to connect at the second level above the first cross member. Preferably, the first and second diagonal support members crisscross one another at the respective midpoints. As such, the truck frame and coach spine are integrally connected in a three-dimensional region of the passenger area so that when a load is placed on the freight area, the resulting forces are distributed over the truck frame and into the passenger area.

The vehicle of the present invention also preferably includes a front axle with a front set of wheels beneath the front portion of the passenger area. A drive axle with dual drive wheels, supported by a trailing arm suspension, and a tag axle with a pair of tag wheels is positioned beneath the rear portion of the freight area behind the drive axle. In addition, preferably, a retractable axle is positioned beneath the freight area between the passenger area and the drive axle. A lift mechanism moves the retractable axle between a retracted position and an extended position. As such, the retractable axle increases the freight hauling capacity of the vehicle.

Also in a preferred embodiment, the engine is positioned under the rear portion of the freight area and disposed between a forward region defined by a ground clearance height and a vehicle height and a rearward region defined by the departure angle and the vehicle height.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 2(*b*) is a top plan view of the upper level of the vehicle taken along line 2*b*—2*b* in FIG. 3.

FIG. 4(*b*) is a rear perspective view of the vehicle in FIG. 4(*a*) loaded with an intermodal container.

FIG. 5(*b*) is a side view of a prior art connector in the locked position.

FIG. 6(*b*) is a perspective view of the vehicle in FIG. 6(*a*) shown carrying an automobile on the freight area.

FIG. 8(a) is a side view of the vehicle shown in FIG. 6(a) with the retractable axle extended.

FIG. 8(b) shows the retractable axle retracted.

FIG. 9(c) is a top plan view of the three-dimensional region taken along line 9c—9c in FIG. 9(a).

FIG. 10(a) illustrates the forces acting on the vehicle shown in FIG. 6(a) when there is no load on the freight area.

FIG. 10(b) illustrates the forces acting on the vehicle shown in FIG. 6(a) when there is a partial load on the freight area.

FIG. 10(c) illustrates the forces acting on the vehicle shown in FIG. 6(a) when there is a full load on the freight area.

DETAILED DESCRIPTION OF THE INVENTION

Figure 1:
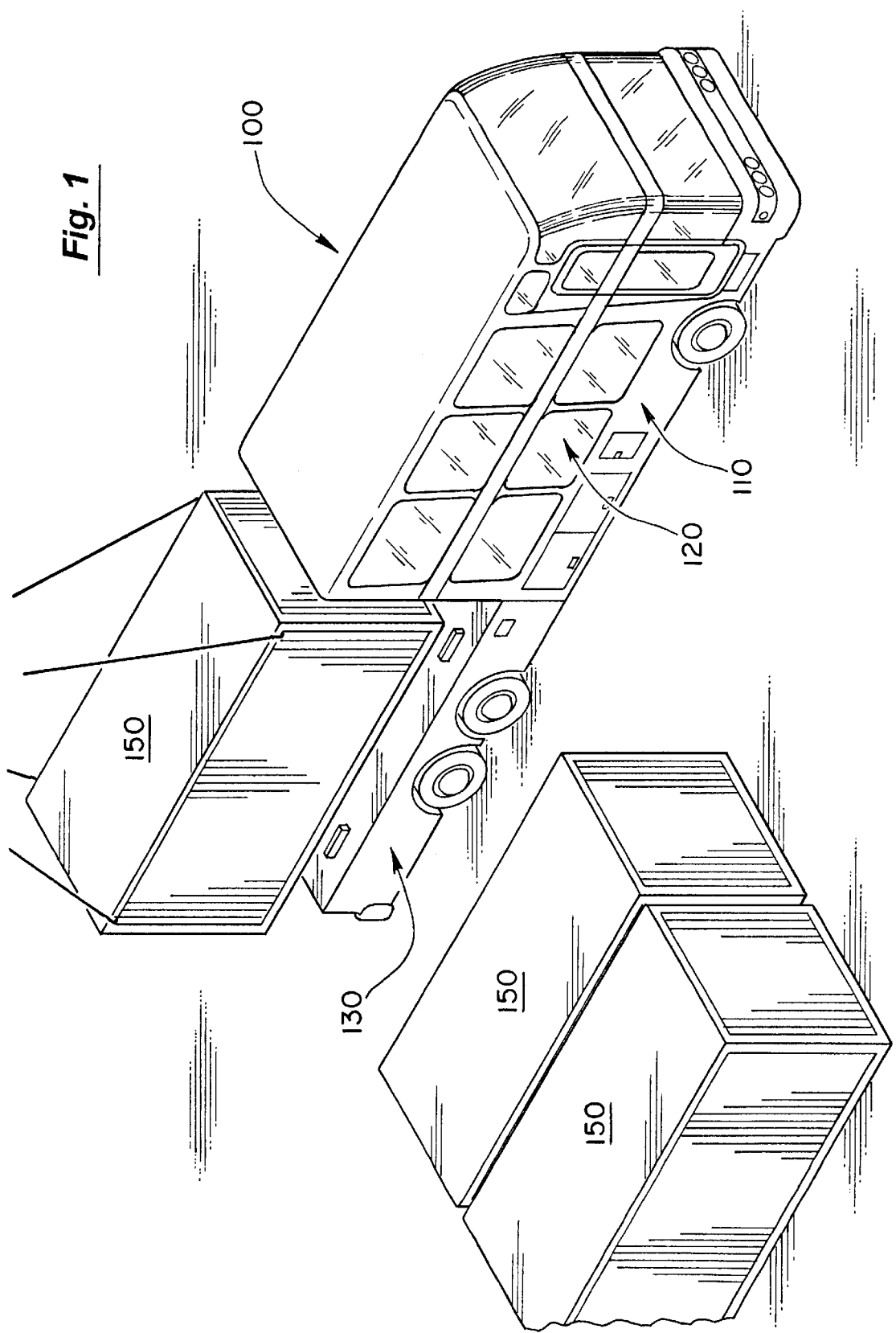
FIG. 1 is a perspective view of a vehicle and intermodal containers of the present invention.

1. Overview. FIG. 1 shows a perspective view of an intermodal coach or vehicle 100 of the present invention. The vehicle 100 has a coach chassis 110 that supports a passenger area 120 and a flatbed area or freight area 130 preferably extending rearward from behind the passenger area 120. An intermodal container 150 can be conventionally loaded (e.g., using a forklift, a crane or any other suitable lifting device) onto the flatbed area 130 and transported to various destinations by the vehicle 100.

It is to be expressly understood that the term "coach chassis" as used herein is used to generally refer to the underlying structure on which the passenger area 120 and the freight area 130 are constructed. One embodiment of such a "coach chassis" is discussed in more detail below with respect to an alternative embodiment of the vehicle 100a (see FIGS. 6(a) and 6(b)). The embodiment of FIGS. 6(a) and 6(b) includes a coach spine 820 and truck frame 830 that are interconnected to one another to support both the passenger area 120a and the freight area 130a.

Figure 6A:
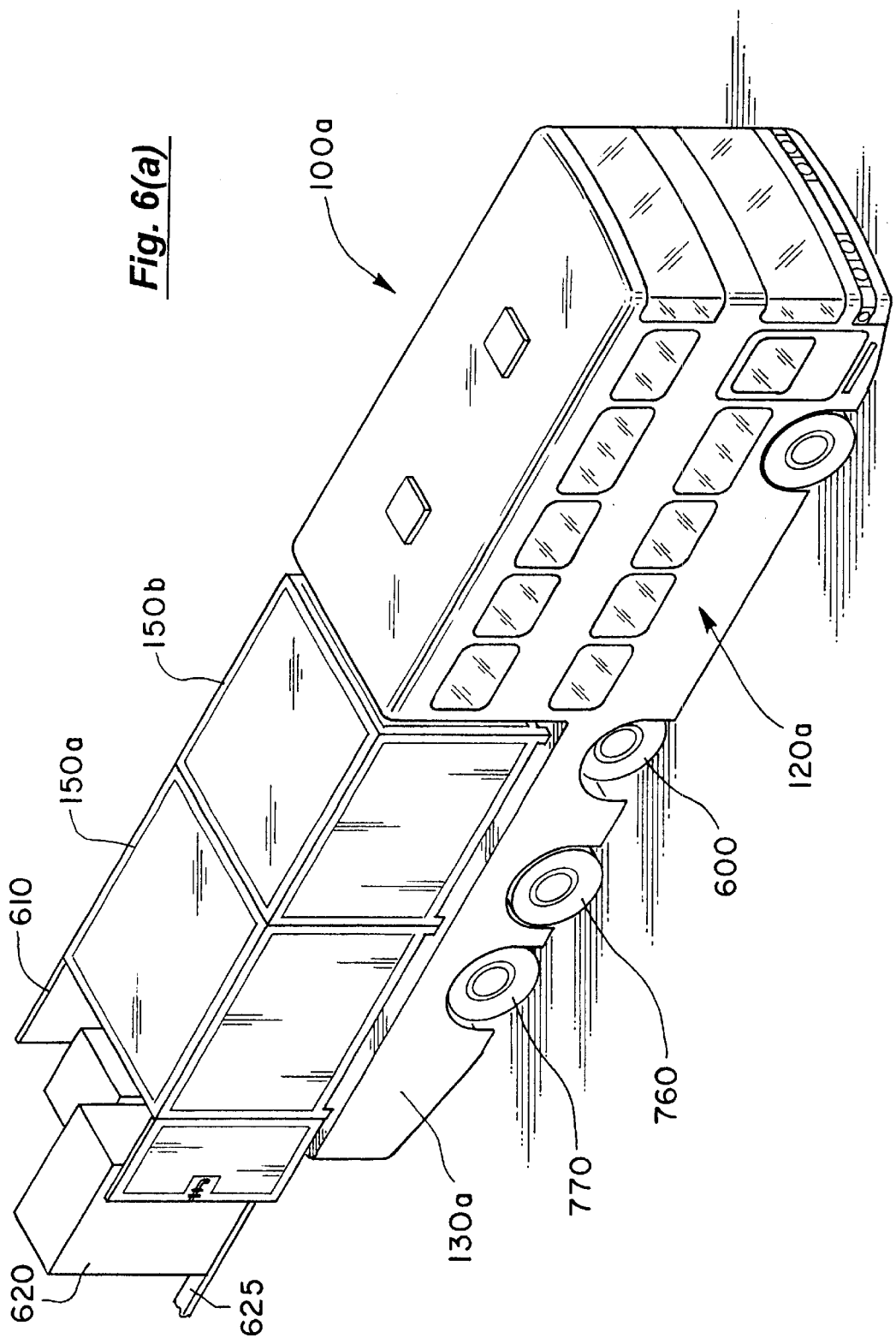
FIG. 6(*a*) is a perspective view of another embodiment of the vehicle of the present invention having a retractable axle.
Figure 6B:
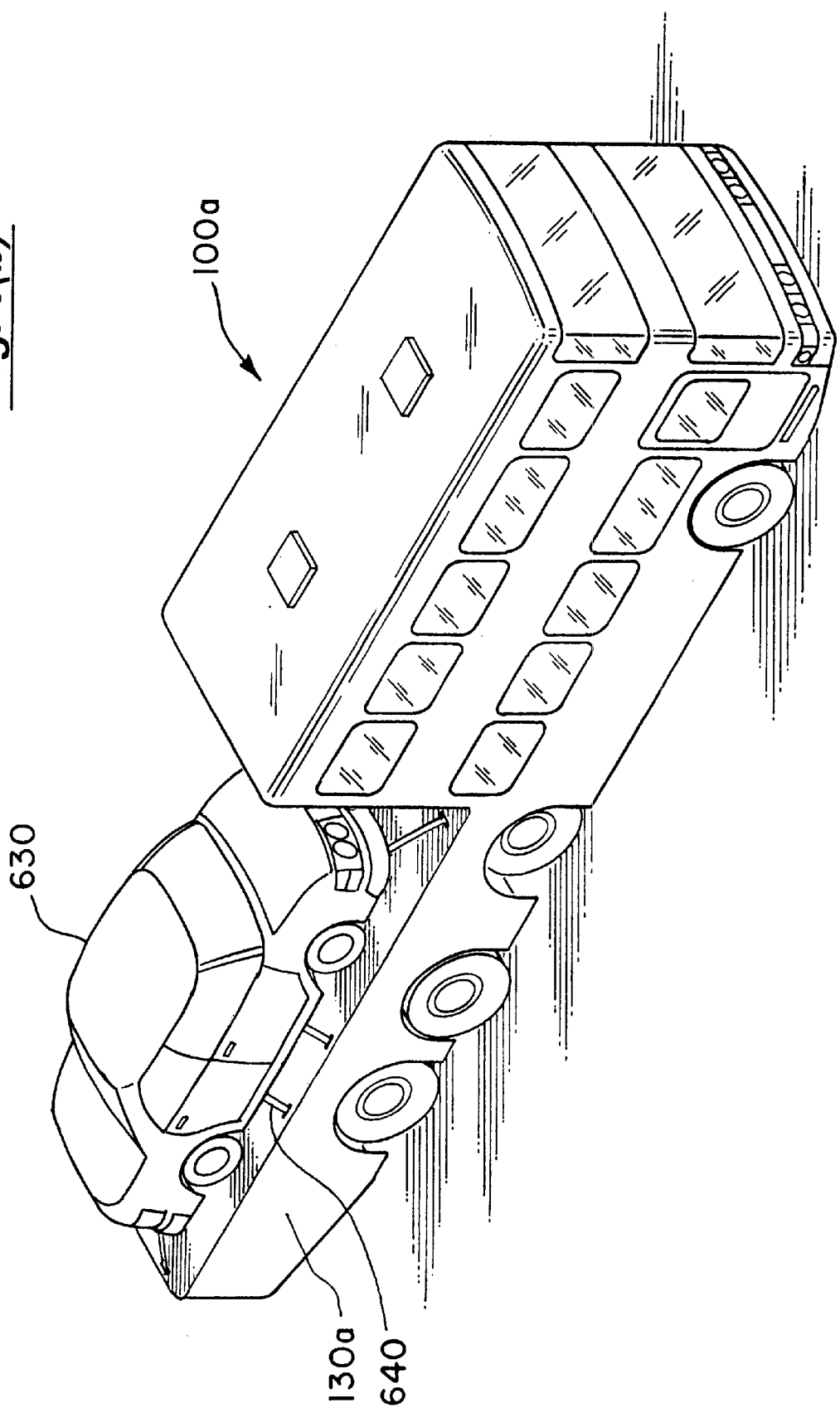

In addition, it is to be understood that the flatbed or freight area 130 in FIG. 1 (or 130a in FIGS. 6(a) and 6(b)) can be made of heavy decking material (i.e., a "flatbed area"), but is preferably made of lightweight decking material (i.e., a "freight area") to increase the hauling capacity of the vehicle 100. An embodiment made of heavy decking material provides sufficient strength to carry loads without any additional supporting platform being mounted thereon, whereas an embodiment made of lightweight decking material requires an additional supporting platform (i.e., an intermodal container or intermodal support platform) be mounted thereon prior to placing a load in the freight area 130. The present invention contemplates both embodiments and the terms "flatbed area" and "freight area" are used interchangeably herein.

It is also to be understood that although in the preferred embodiment the passenger area 120 is at the forward portion of the intermodal coach or vehicle 100, the passenger area 120 can be positioned in any convenient manner. By way of example, and not intending to limit the scope of the present invention, the passenger area 120 can be positioned at the rearward portion of the vehicle 100, in which case a separate driver area (not shown) would be provided near the front of the vehicle 100 behind which the intermodal container 150 would be loaded, and the passenger area 120 would thus be positioned behind the intermodal container 150. Indeed, in some embodiments, the passenger area 120 can be split so that the intermodal container 150 is loaded between separate portions of the passenger area 120.

The terms "coach" and "bus" are used by the mass transit industry to distinguish between inter-city passenger vehicles (i.e., "coaches") and inner-city passenger vehicles (i.e., "buses"). That is, "coaches" typically have more amenities (e.g., a latrine, individual high-back seating, insulation for a quiet passenger area, etc.), luggage compartments, large capacity fuel tanks, and other features which make a coach more suitable for long-distance travel. On the other hand, "buses" typically have only the "bare-bone" necessities (e.g., bench seating). However, it is to be expressly understood that the term "vehicle" and "coach" as used herein are intended to include both inter-city passenger coaches as well as inner-city passenger buses. Indeed, the vehicle of the present invention is not limited to long-distance travel and can be used as an inner-city passenger and freight vehicle.

Figure 2:
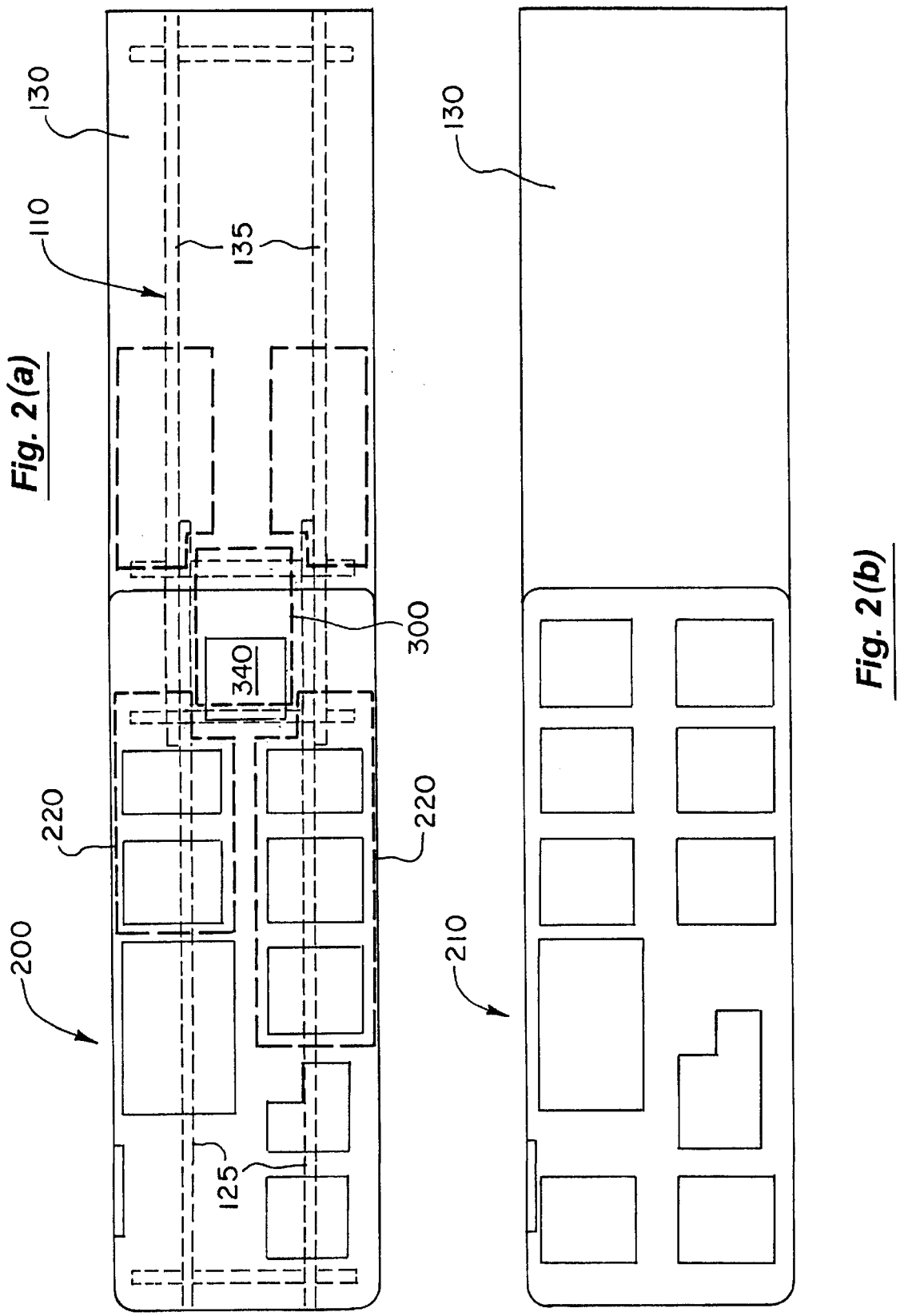
FIG. 2(*a*) is a top plan view of the lower level of the vehicle of the present invention taken along line 2*a*—2*a* in FIG. 3.

Preferably, the passenger area 120 is a double-decker passenger area (i.e., has two levels 200 and 210 shown in FIGS. 2(a) and 2(b), respectively). In addition, a club or table area can be provided (e.g., on the lower level). Accommodations can also be provided for handicapped passengers, including wheelchair seating and wheelchair access (e.g., ramps, lifts, etc.), a handicapped-accessible lavatory, etc. In addition, luggage bays 220 (e.g., one or two) and overhead shelving (not shown) for carry-on luggage are preferably provided.

It is to be expressly understood that in some embodiments the passenger area 120 can have only a single level or it can have more than two levels. In addition, the configuration of the passenger area 120 (e.g., passenger seating, luggage bays, amenities, etc.) is immaterial to the present invention.

Figure 4A:
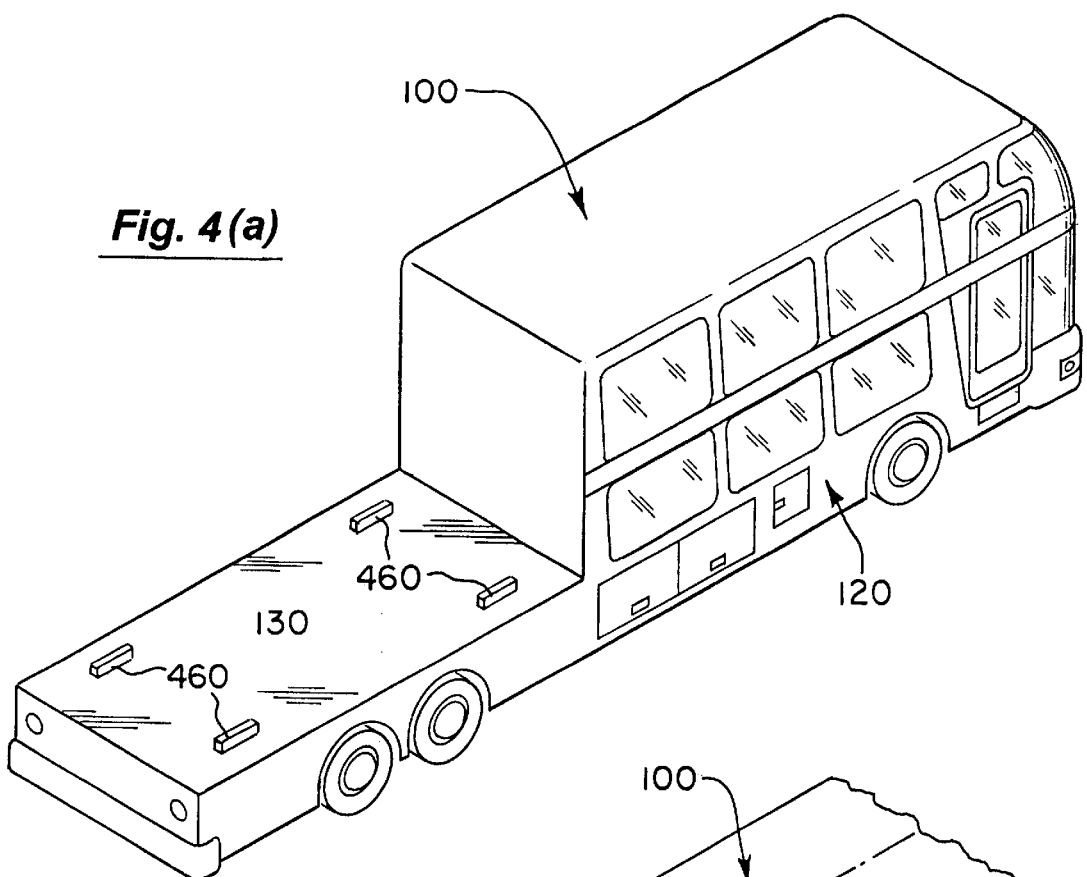
FIG. 4(*a*) is a rear perspective view of the vehicle shown in FIG. 1.
Figure 4B:
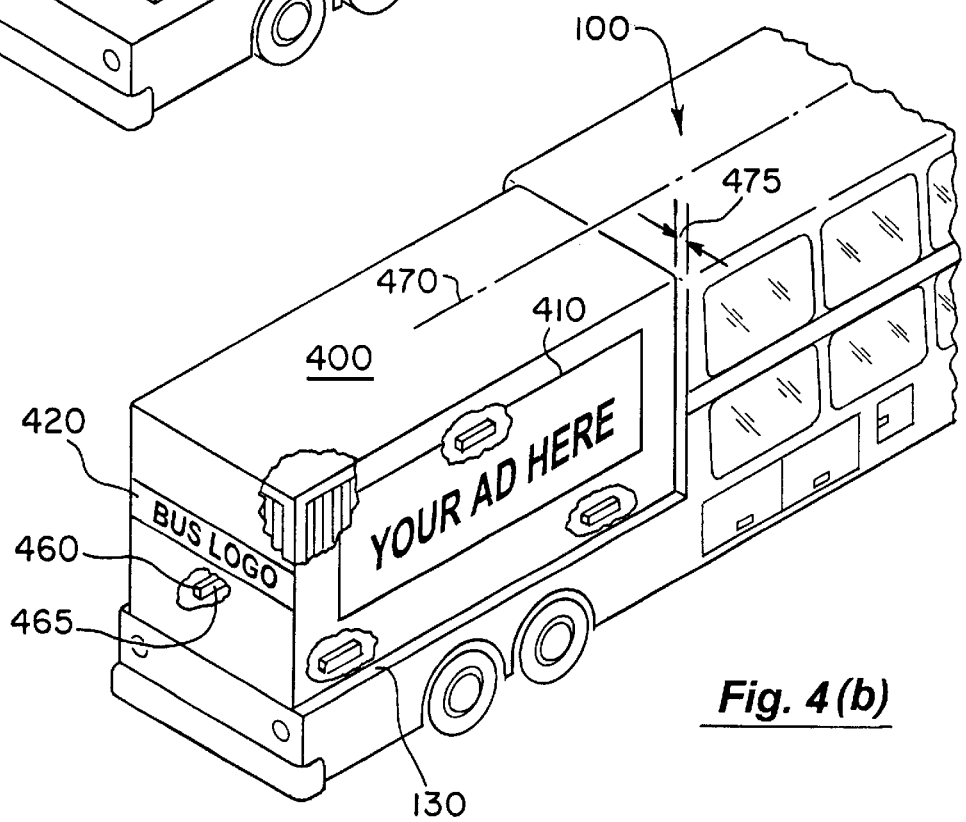

In a preferred embodiment the dimensions of the flatbed or freight area 130 are such that when the intermodal container 150 is loaded onto the flatbed or freight area 130, the top of the passenger area 120 is substantially flush 470 (see FIG. 4(b)) with the intermodal container 150 and the sides of the intermodal container 150, although slightly inset 475 (see FIG. 4(b)) in a preferred embodiment, are substantially flush with each side of the passenger area 120, as shown in FIG. 4(b). As such, wind resistance is reduced to maintain fuel economy and further provide the passengers with a quiet, gentle and comfortable ride. In addition, the vehicle 100 does not exceed standard clearances and meets or exceeds transportation safety standards.

2. Specifications. In a preferred embodiment (shown in FIG. 3), the intermodal coach or vehicle 100 is powered by a conventionally available engine 300, cooled by a conventionally available radiator 340. A conventionally available transmission (not shown) drives the vehicle 100. The drive axle 320, the front axle 330 and a pusher or tag axle 335 (i.e., a load bearing axle that is not powered) are conventionally available. Each axle is preferably provided with independent air suspension.

Figure 3:
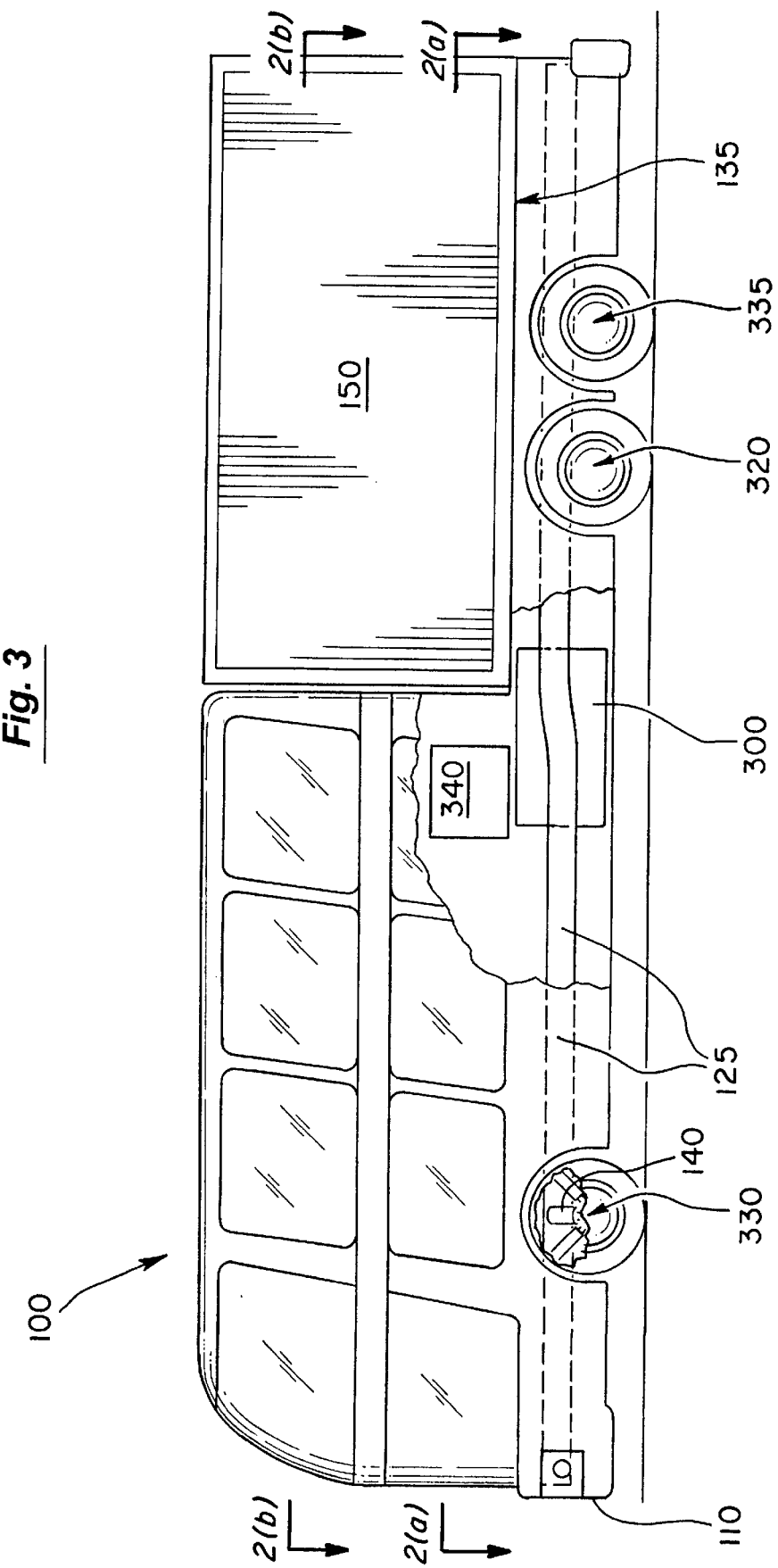
FIG. 3 is a side view with a partial cutaway of the vehicle shown in FIG. 1.

The coach chassis 110 is preferably comprised of a frame 125, an intermodal support 135 and a bus suspension 140, shown in FIG. 3. The bus suspension is preferably designed to provide a gentle, quiet ride for the passengers in the passenger area 120. The frame 125 and intermodal support 135, on the other hand, are preferably designed for strength to support the intermodal container 150.

The intermodal coach or vehicle 100 dimensions, weight restrictions, and other design considerations can all be conventionally computed based on the size and weight of the intermodal container 150, passenger capacity, safety regulations, etc. In some embodiments, for example where greater or fewer passengers are accommodated for, the specifications including the maximum allowable container weight can be modified accordingly. Likewise, the values can be changed to reflect future safety regulations, so long as the vehicle 100 of the present invention has a coach chassis 110 that can both support a load while maintaining the comfort of the ride for the passengers in passenger area 120, and that the comfort of the ride be maintained even without a load. That is, the vehicle 100 can be driven empty (FIG. 4(a)) or loaded (FIG. 4(b)) and either way preferably preserve the comfort of the ride for the passengers (e.g., the ride will not be, or will only slightly be, affected whether the vehicle 100 is driven empty or loaded with an intermodal container 150). Furthermore, as shown in FIGS. 4(a) and 4(b), preferably taillights, brake lights, license plates, etc. are independent of the intermodal container 150. Thus, even when the vehicle 100 is driven empty, the taillights, brake lights, etc. are still visible. However, in some embodiments, electrical connections can be provided for the intermodal container 150 (e.g., for lighting, refrigeration, etc.).

3. Intermodal Containers. A typical intermodal container 150 shown in FIG. 1 is a rectangular, corrugated steel framed container. Intermodal containers 150 are conventionally available and commonly used to transport containerized freight by ship, by train, and by truck.

Preferably, the present invention uses intermodal containers 150 conforming to the International Standards Organization (ISO) uniform standards for containers. That is, the basic intermodal container 150 is a general purpose dry freight standard container measuring twenty feet long, eight feet wide, and eight and one-half feet high. In general, twenty-foot containers are used to carry heavy, dense cargo loads (e.g., industrial parts and certain food products) and in areas where transport facilities are less developed. Because the vehicle 100 of the present invention is limited in length by the passenger area 120, a preferred embodiment of the intermodal coach or vehicle 100 is constructed to carry the standard twenty-foot intermodal container 150.

The intermodal container 150 can be any suitable color or have any suitable design thereon. In one embodiment, the intermodal container 150 is painted to correspond to the color scheme or design of the vehicle 100 (e.g., the carrier's name) or can have advertisements thereon. However, in a preferred embodiment shown in FIGS. 4(a) and 4(b), the intermodal container 150 is not owned by the owner of the vehicle 100, and the vehicle 100 is merely serving to transport the intermodal containers 150 of others. In such an embodiment, the intermodal container 150 can be wrapped in a cover 400 (e.g., plastic, canvas, or other suitable cover material). The cover 400 in turn can have advertising 410, the coach logo 420, etc. displayed thereon (e.g., applied directly to the cover 400, clipped to the cover 400, etc.).

It is to be expressly understood that any cargo can be shipped in the intermodal container 150 and will only be limited by the Department of Transportation (i.e., weight and/or safety regulations). Indeed, the intermodal container 150 need not be an enclosed container and can instead be a platform such as is conventionally available for transporting heavy equipment. In such a case, the equipment (e.g., tractors, automobiles, airplane parts, etc.) to be transported is secured within or to the intermodal container 150 (or to a platform, not shown) independent of the vehicle 100 and loaded as a single unit onto the flatbed or freight area 130 of the vehicle 100. Similarly, the intermodal container 150 can have a conventionally available tank (not shown) attached thereto. Again, the tank is secured to a standard intermodal platform independent of the vehicle 100 and the standard intermodal platform is then loaded and secured onto the flatbed or freight area 130 of the vehicle 100.

4. Attachments. The intermodal container 150 is secured to the flatbed or freight area 130 of the intermodal coach using attachments 460, shown in FIGS. 4(a) and 4(b). Attachments 460 are conventionally available and preferably standard to facilitate the interchangeability of the intermodal container 150 between various carriers (e.g., between a truck and the intermodal coach or vehicle 100, or between a train and the intermodal coach or vehicle 100, etc.).

Attachments 460 are preferably conventional lift/stack fittings. That is, the intermodal container 150 typically has an oval shaped hole 465 formed within each of the four corners of the intermodal container 150. When stacked at a freight yard (see e.g., FIG. 1), the containers are conventionally connected to one other using inter-box connectors (IBCs), which are hardware that fit into the oval holes of each container above and below and can be turned to lock the two together. An IBC-type attachment 460 (FIG. 4(a)) is also used to secure the intermodal container 150 to the flatbed or freight area 130 of the intermodal coach or vehicle 100.

In the preferred embodiment, four attachments 460 are provided, one on each corner of the flatbed or freight area 130, thus facilitating the interchangeability of the intermodal containers 150 between the intermodal coach or vehicle 100 and other transportation vehicles and storage facilities (see FIG. 4(a)). However, in an alternative embodiment, more than four attachments 460 can be provided. For example, one attachment 460 can be provided at each corner, and one or more attachments 460 can be provided between each corner. Likewise, the intermodal container 150 can be secured to the flatbed or freight area 130 using more than one type of attachment 460. For instance, four attachments 460 can be provided, one at each corner of the flatbed or freight area 130, and the intermodal container 150 can be additionally strapped to the flatbed area 130 using a conventional strap or chain.

It is to be expressly understood that any suitable attachment 460 can be used under the teachings of the present invention. For example, latches can be used. Alternatively, a barrier can be formed around the perimeter of the flatbed or freight area 130 to keep the intermodal container 150 from sliding laterally, and the intermodal container 150 can then be strapped to the flatbed or freight area 130. Other embodiments for securing the intermodal container 150 to the flatbed or freight area 130 of the vehicle 100 will occur to those skilled in the art and the scope of the present invention is not to be limited by the number or type of attachments 460 used.

Figure 5A:
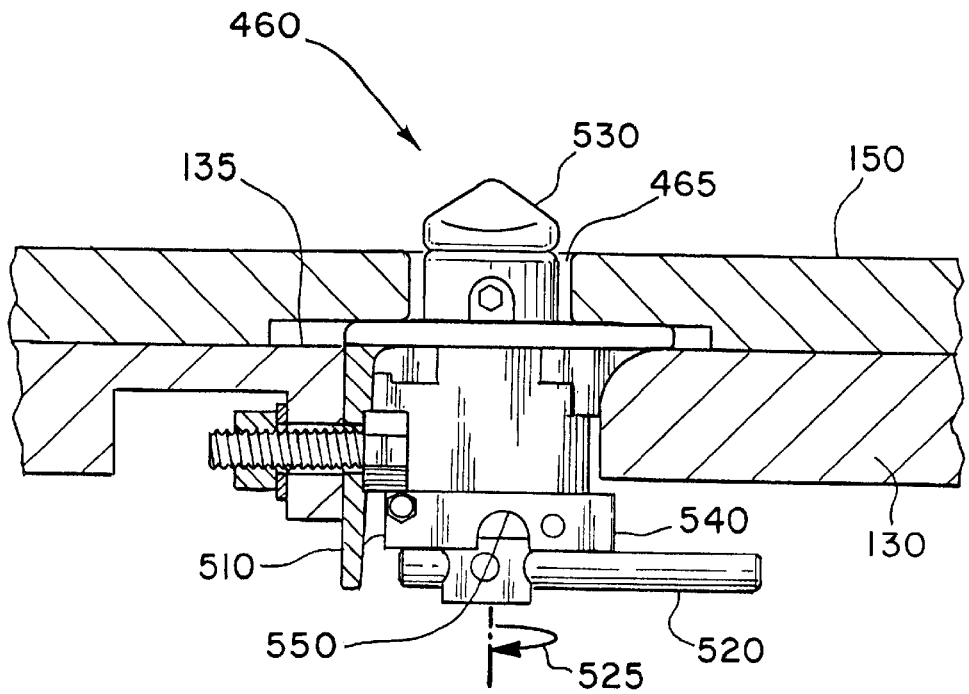
FIG. 5(*a*) is a side view of a prior art connector in the unlocked position.
Figure 5B:
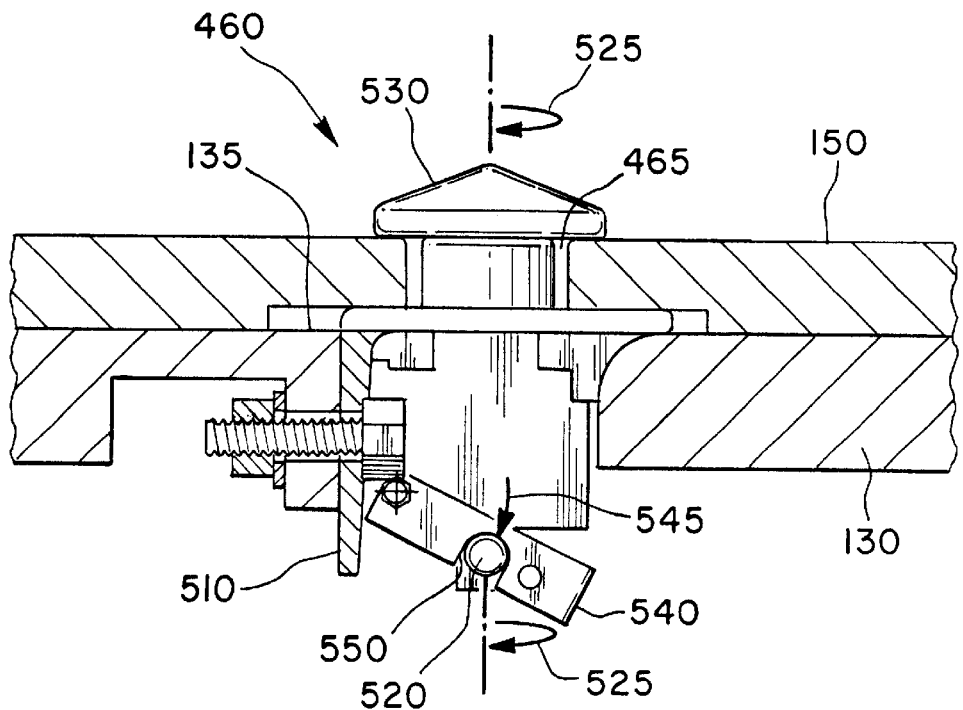

FIGS. 5(a) and 5(b) show a conventionally available attachment or connector 460 that can be used under the teachings of the present invention to removably secure an intermodal container 150 to the freight area 130 of the vehicle 100. A housing 510 is connected (e.g., welded or bolted) to the freight area 130 so that a handle 520 is preferably below the surface 135 and an oval shearblock 530 extends above the surface 135. The handle 520 is connected to the oval shearblock 530 so that as the handle 520 is turned (e.g., in the direction of arrow 525), the oval shearblock 530 also rotates so that the oval is facing ninety degrees from its starting position (e.g., see FIGS. 5(a) and 5(b)). Thus, in use as shown in FIG. 5(a), an intermodal container 150 is placed onto the freight area 130 so that the oval holes 465 formed in the bottom of the intermodal container 150 line up with the oval shearblock 530 and the oval shearblock 530 thus extends up and is received into the oval hole 465. The handle 520 is then rotated 525 so that the oval shearblock 530 rotates within the oval hole 465 and locks the intermodal container 150 in place on the freight area 130. When an oval shearblock 530 is not properly aligned (i.e., so that the oval shearblock 530 fits readily through the oval hole 465), the oval shearblock 530 is forced downward by the intermodal container 150. The handle 520 is then rotated 525 to align the oval shearblock 530 with the oval hole 465 so that the oval shearblock 530 (preferably spring-biased) is received within the oval hole 465. Once properly aligned within the oval hole 465, the handle 520 is turned 525 and the intermodal container 150 is locked onto the freight area 130 as shown in FIG. 5(b). Once the handle 520 is turned so that the intermodal container 150 is locked into place on the freight area 130, latch 540 can be pivoted (e.g., in the direction of arrow 545) over the handle 520 and engages the handle 520 at notch 550, thus securing the handle 520 so that it does not unlock. To remove the intermodal container 150, the latch 540 is opened and the handle 520 is rotated in the opposite direction of arrow 525 to unlock connector 460 from the intermodal container 150.

It is to be expressly understood that other connectors or attachments (e.g., straps, etc.) can be used under the teachings of the present invention and the present invention is not limited to that shown and described with respect to FIGS. 5(a) and 5(b).

5. Overview of an Alternative Embodiment. An alternative embodiment of the vehicle of the present invention (i.e., 100a) is shown in FIGS. 6(a) and 6(b). The vehicle 100a has passenger area 120a similar to that described above, and a freight area 130a. In addition, a lift axle or retractable axle 600 is shown disposed beneath the freight area 130a behind the passenger area 120a, as explained in more detail below.

It is to be expressly understood that the retractable axle 600 need not be positioned directly behind the passenger area 120a. For example, in other embodiments the retractable axle 600 can be positioned beneath the passenger area 120a, at the rear portion of the freight area 130a, or between the drive axle 760 and the tag axle 770. Likewise, passenger area 120a need not be a double-decker coach.

The vehicle 100a is shown carrying two, ten-foot long intermodal containers 150a and 150b, removably attached to the freight area 130a similarly to that described above with respect to the single intermodal container 150. The vehicle 100a can be operated as a conventional freight carrier in the trucking industry. That is, the doors 610 of container 150a are opened, and some freight 620 is removed from the container 150a (e.g., using forklift 625), then the doors 610 are closed and the vehicle continues to the next stop with the same container 150a. Indeed, the freight area 130a can be an enclosure that is constructed as an integral part of the vehicle 100a and need not be removable at all. Alternatively, entire containers 150a,b can be delivered, removed, and the vehicle 100a reloaded with other containers 150a,b. As such, the vehicle 100a can participate in any number of freight markets. For example, the vehicle 100a can be used to deliver individual shipments to loading docks (e.g., under a post office or package delivery contract, or automobiles to dealerships), deliver individual shipments to multiple destinations (e.g., a shipment of clothes to a retail outlet and a shipment of electronics to another retail outlet or warehouse), or deliver entire containers (e.g., to freight staging areas, warehouses, shipyards, trains), etc. Alternatively, the vehicle 100a can operate in a combination mode where some freight 620 is unloaded at several stops and the entire container 150a is unloaded from the vehicle 100a and a full container 150a is loaded onto the vehicle 100a at the final stop. The above examples are merely illustrative of the various and different types of freight the vehicle 100a can carry and other embodiments are contemplated under the teachings of the present invention.

It is understood that the vehicle 100a of the present invention is not to be limited by the type of freight loaded onto freight area 130a. That is, a single intermodal container 150 (FIG. 1), multiple intermodal containers 150a, 150b (FIG. 6(a)), or other types of containers (e.g., containerized platforms, airline belly containers, etc.) can be used under the teachings of the present invention. Any suitable type and number of container can be used under the teachings of the present invention. In other embodiments the container can be permanently attached or integrally formed as part of the freight area 130a of the vehicle 100a. Indeed, in another embodiment shown in FIG. 6(b), the freight loaded on a flatbed area 130a (i.e., having sufficient support structure or heavy decking as described above) need not be containerized at all (e.g., automobile 630, construction equipment, lumber, conduit, etc.) and can be attached to the freight area 130a using any suitable conventional attachments (e.g., straps 640, chains, gates, etc.). It is also understood that the freight (e.g., container 150, automobile 630, etc.) can be loaded using any conventional means such as forklifts, cranes, ramps, etc.

Table I lists the specifications for a preferred embodiment of the vehicle 100a shown in FIGS. 6(a) and 6(b).

TABLE I

| Parameter | Specification |
| --- | --- |
| Overall Length | 538.5 inches |
| Overall Width | 102 inches |
| Overall Height | 161.5 inches |
| Passenger Area Length | 260 inches |
| Passenger Area Standing Height (per Level) | 69.5 inches |
| Front Overhang | 92.8 inches |
| Wheelbase | 269 inches |
| Rear Axle Spacing | 61.9 inches |
| Rear Overhang | 114.7 inches |
| Retractable Axle Spacing | 72.68 inches forward of drive axle |
| Approach Angle | 9 degrees |
| Departure Angle | 9 degrees |

The above set of specifications are preferred. It is to be expressly understood that these specifications can vary without departing from the teachings of the present invention.

Figure 7:
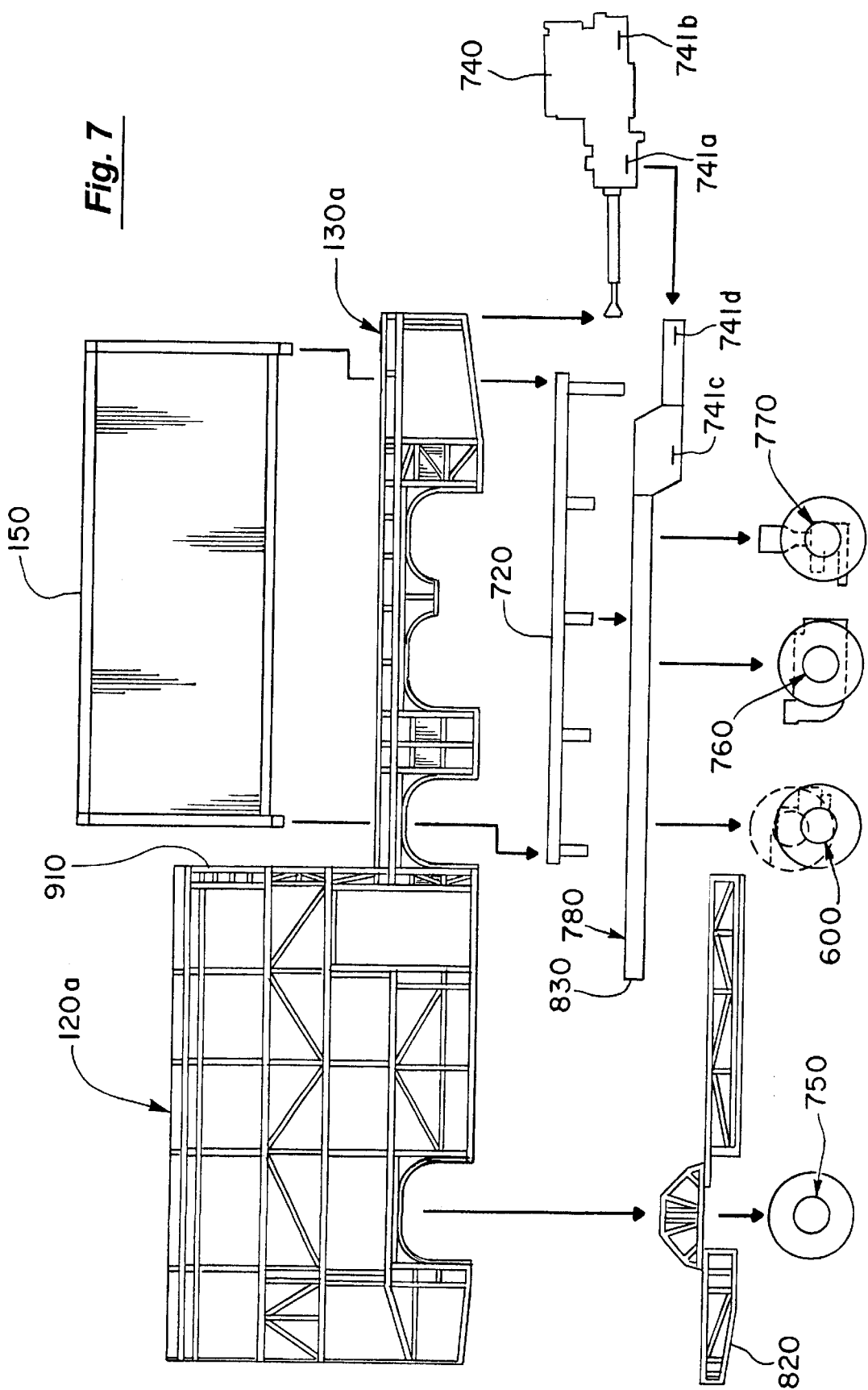
FIG. 7 is a spatial view showing several components of the vehicle in FIG. 6(*a*).

6. Details of the Frames. The major components of the vehicle 100a, including the frames, are shown in FIG. 7. A forward frame 820 is connected (e.g., welded, bolted, etc.) beneath the passenger area 120a to support the passenger area 120a. The forward frame 820 is preferably a conventionally available coach spine that has been modified for use with the vehicle 100a. That is, the forward frame or coach spine 820 is preferably shortened to extend from the front of the passenger area 120a to the rear wall 910 of the passenger area 120a. A rearward frame 830 (e.g., 10 inch×0.25 inch×3 inch flange, 110,000 psi yield strength) is connected beneath the freight area 130a to support the freight area 130a. The rearward frame 830 is preferably a conventionally available truck frame that has been modified for use with the vehicle 100a. That is, the rearward frame or truck frame 830 preferably extends from the rear portion of the freight area 130a through the rear wall 910 and into the passenger area 120a where it overlaps (i.e., 940) with the coach spine 820 and is connected thereto by plate 920 (FIG. 9(a)), as explained in more detail below. In addition, a container or cargo frame 720 can be connected over the truck frame 830 to provide additional structural and lateral support for freight loaded on the freight area 130a, to attach connectors 460 (FIGS. 5(a) and 5(b)), etc.

It is to be expressly understood that the structure of the coach spine 820 (FIG. 7) is conventional and can vary based on design considerations. Indeed, the coach spine 820 need not be modified as set forth above, and can for example, abut the truck frame 830. In another embodiment, the coach spine 820 and the truck frame 830 can be integrally formed as a single frame having the respective characteristics of each frame 820, 830. Preferably, the container or cargo frame 720 and the truck frame 830 bear the majority of the load on the freight area 130a and structure of the freight area 130a provides a finished appearance. However, in another embodiment, the structure of the freight area 130a can provide additional support for the load. Also in an alternative embodiment, the container or cargo frame 720 can be integrally formed as part of the truck frame 830 or omitted altogether.

7. Passenger Area. FIG. 8(a) is a side view of the vehicle 100a. The passenger area 120a is shown cut-away to reveal the seating arrangement therein. It is to be understood, however, that many other seating arrangements, including those that comply with government disability regulations, are contemplated under the teachings of the present invention. Likewise, a luggage compartment 220a (carrying luggage 225a) is shown against the rear wall 910 of the passenger area 120a.

Figure 8C:
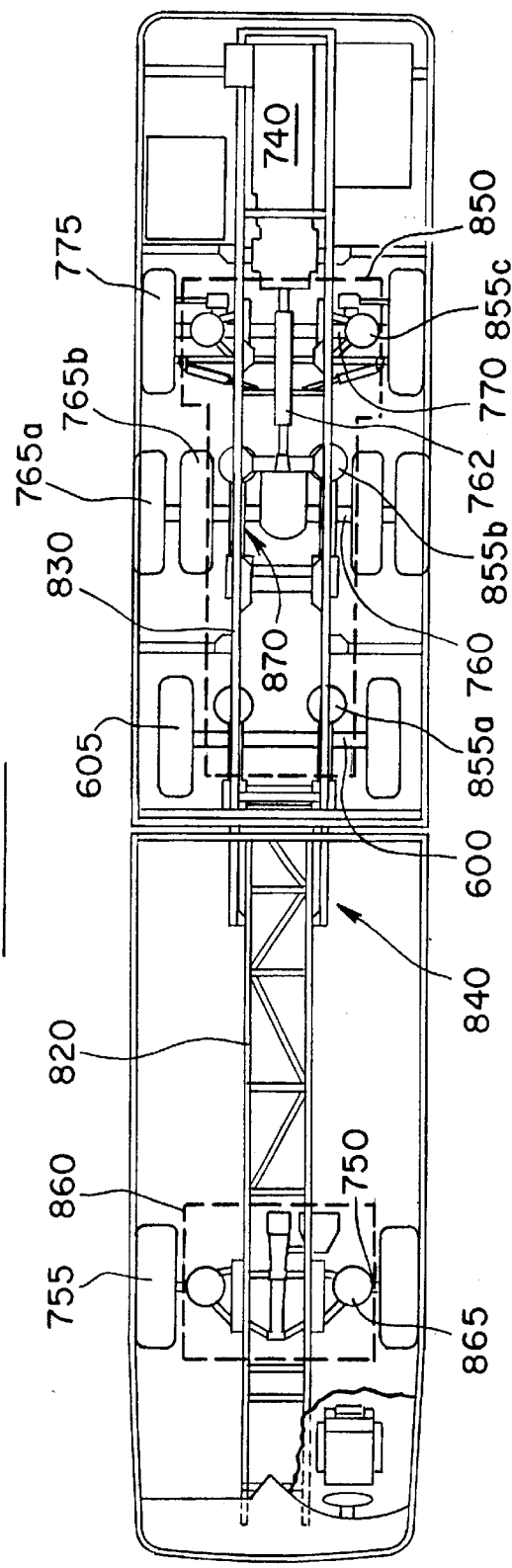
FIG. 8(c) is a top view of the lower level of the vehicle shown in FIG. 8(a) taken along line 8c—8c in FIG. 8(a).
Figure 8D:
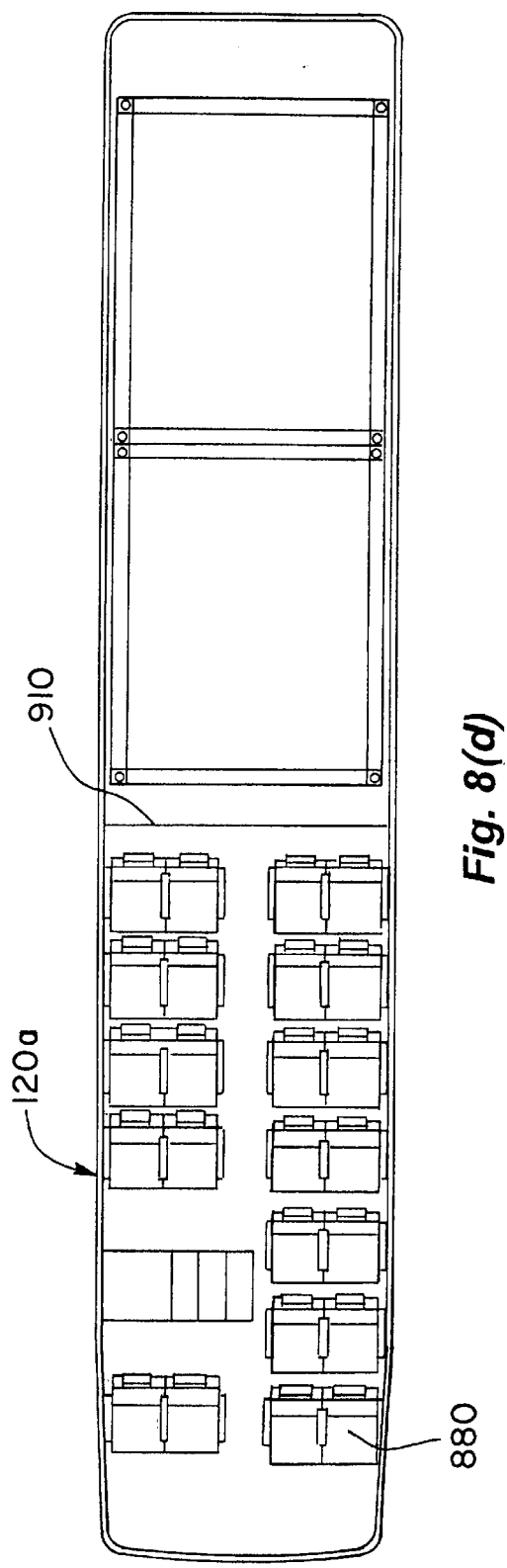
FIG. 8(d) is a top view of the upper level of the vehicle shown in FIG. 8(a) taken along line 8d—8d in FIG. 8(a).

FIG. 8(d) is a top view taken along line 8d—8d of FIG. 8(a). Passenger seating (e.g., 880) is shown on the top level of the passenger area 120a. In a preferred embodiment, up to 35 passenger seats are arranged on the first and second levels. However, it is to be expressly understood that any suitable number and arrangement of passenger seating can be provided in the passenger area 120a under the teachings of the present invention. In addition, as explained above, handicap seating, beds, a galley, a bar, and other amenities in the passenger area 120a are contemplated by the present invention. It is to be expressly understood that although the passenger area 120a is conventional, the design can vary based on design considerations such as the shape, height, levels, etc. of the passenger area 120a.

8. Wheel and Axle Arrangement. The retractable axle 600 is shown in FIG. 8(a) in the extended position. FIG. 8(b) illustrates the retractable axle 600 going from an extended position 810 (e.g., as shown in FIG. 8(a)) to a retracted position 815. FIG. 8(c) is a top view taken along line 8c—8c of FIG. 8(a) to show the arrangement of axles and wheels beneath the passenger area 120a and the freight area 130a. Preferably, the vehicle 100a has a front axle 750 (e.g., a conventionally available 8.5 metric ton axle that can support up to 18,734 lbs) beneath the passenger area 120a with a pair of wheels 755 and tires (e.g., Michelin 315/65R 22.5, 9370 lbs) attached thereto. A drive axle 760 (e.g., Meritor, Spicer ZF, etc. axle that can support up to 26,000 lbs) connected by a drive shaft 762 to the engine 740 preferably has a pair of dual wheels 765a,b and tires (e.g., Michelin 12R/22.5, 6750 lbs) beneath the freight area 130a. A tag axle 770 (e.g., a conventionally available axle that can support up to 16,540 lbs) behind the drive axle 760 provides additional support to the freight area 130a and has a pair of wheels 775 and tires (e.g., Michelin 12R/22.5, 7390 lbs) attached thereto. The vehicle 100a also has a retractable axle 600 (e.g., Neway Airlift Axle NLA-200T that can support up to 20,000 lbs; available from Holland Neway International, Inc., Muskegon, Mich., hereinafter "Neway") behind the passenger area 120a beneath the freight area 130a ahead of the drive axle 760. A pair of wheels 605 and tires (e.g., Michelin 12R/22.5, 7390 lbs) are rotatably mounted to the retractable axle 600.

Preferably a conventionally available manual activation system (i.e., available from Neway) is provided that operates the retractable axle 600 between the positions 810, 815 shown and discussed with respect to FIG. 8(b). It is understood that automatic activation systems are also conventionally available. Likewise, a conventionally available load sensor (not shown) can be used under the teachings of the present invention and either mounted inside the passenger area 120a (e.g., in view of the driver) or at or near the axles to measure the weight of the load on the freight area 130a. A conventionally available gauge or other display (also not shown) can be provided again either in view of the driver or at or near the axles to display the weight of the load measured by the load sensor.

It is understood that the term "axle" as used herein refers to the structure supporting at least one pair of wheels on opposing sides of the vehicle 100a, and is not limited to a single structure. For example, the term "axle" includes the entire structure and all conventionally associated components supporting both front wheels 755 on either side of the vehicle 100a shown in FIG. 8(c) as well as the structure 600 supporting both retractable wheels 605 on either side of the vehicle 100a shown in FIG. 8(c). It is also to be expressly understood that the axle arrangement shown in FIG. 8(c) and described above is that of a preferred embodiment, however, other axle and wheel/tire arrangements, including the number thereof, are contemplated under the teachings of the present invention.

Figure 8E:
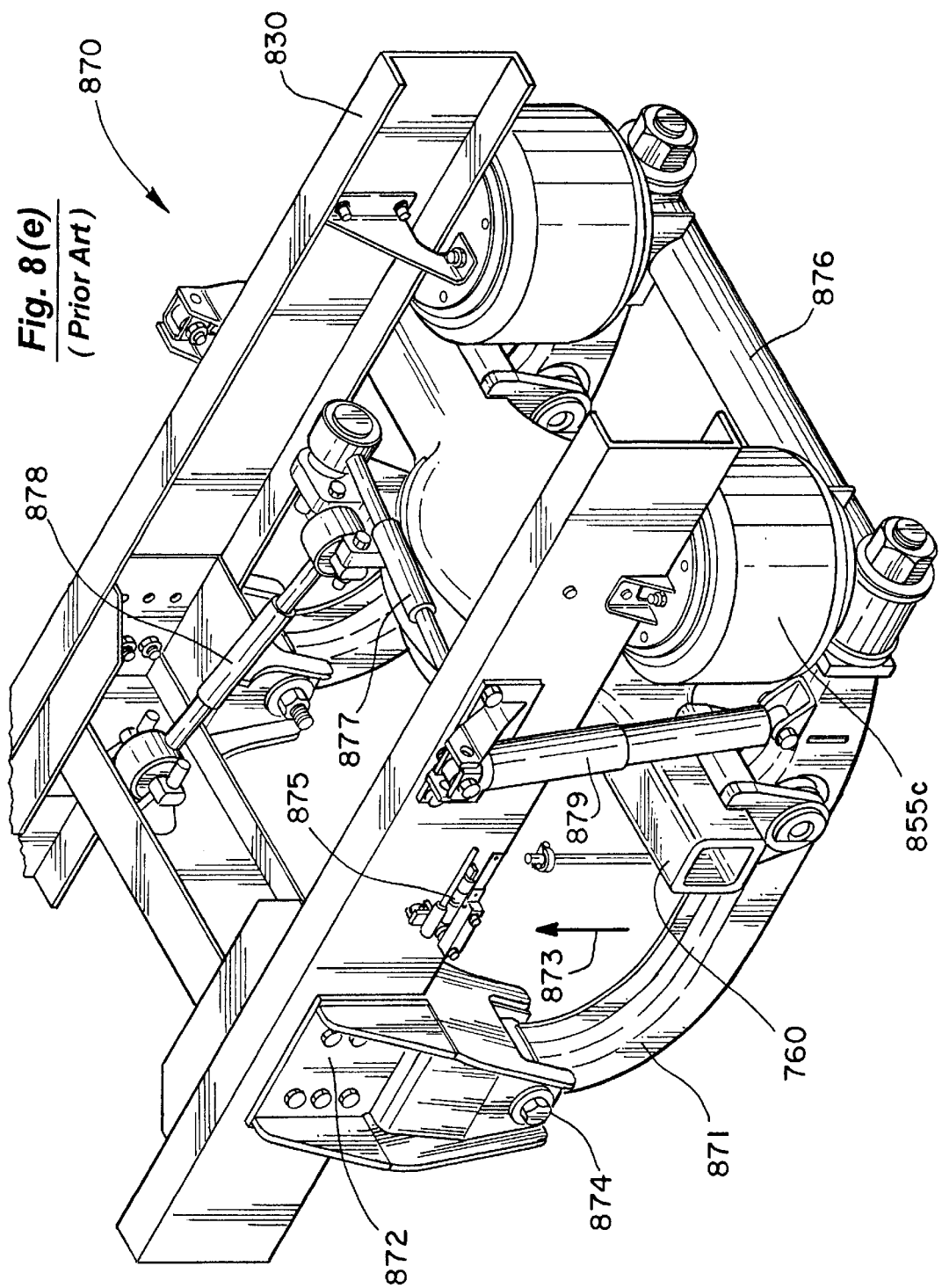
FIG. 8(e) is a perspective view showing details of a trailing arm suspension.

9. Suspension System. The vehicle 100a also has a freight suspension system (e.g., 850 in FIG. 8(c)) that preferably includes at least conventional adjustable air springs 855a,b,c (and on each side of the respective axles) that can be adjusted according to the load placed on the freight area 130a. Likewise, a passenger suspension system 860 with adjustable air springs 865 provides passengers riding in the passenger area 120a with a consistently smooth, comfortable ride under various loadings (i.e., those described below with respect to FIGS. 10(a)–10(c)). The drive axle 760 preferably includes a trailing arm suspension 870. Details of the trailing arm suspension 870 are shown in more detail in FIG. 8(e). The tires, wheels and brakes are not shown in FIG. 8(e) for clarity. The drive axle 760 is preferably positioned 269 inches back from the front axle 750 and rigidly attached to the trailing arm 871. The trailing arm 871 is fastened to the truck frame 830 with a frame mounting bracket 872. When at least one of the tires 765a,b of the drive axle 760 strikes a bump, the drive axle 760 and trailing arm 871 move upward (e.g., in the direction of arrow 873), pivoting about the trailing arm pivot 874. The upward movement 873 of the trailing arm 871 compresses the air spring 855*c* and signals the air leveling valve 875 to readjust air pressure to the air spring 855*c* to level the vehicle 100*a*. Movement of the vehicle 100*a* is restrained by the transverse beam 876 which increases roll stability or resistance to lean, by the track bar 877 which restricts lateral movement or sway by the torque rod 878 which restricts axle roll and by the shock absorber 879 which dampens or cushions the movement of the air spring 855*c*.

It is to be understood that other suspension systems can be used under the teachings of the present invention to provide the requisite ride to the passengers and support for the freight and indeed, different suspension systems can be used for different axles or different areas (e.g., the passenger area 120*a* and the freight area 130*a*).

It is understood that the term "comfortable" as used herein means a ride comparable to what a passenger riding in a conventional motor coach would expect. That is, the passengers in the passenger area 120*a* do not notice a significant difference in the ride when the vehicle 100*a* is carrying a full load, a partial load, or no load at all, and the ride is consistently or close to what a passenger would expect from a conventional motor coach. The comfort of the ride provided by the suspension system can also be supplemented by the seating (e.g., 880), design of the passenger area 120*a*, arrangement of the loads on freight area 130*a* to reduce wind resistance, sound proofing, etc. It is also to be expressly understood that while the freight suspension system 850 is shown and described with respect to the rear axle 770, each axle 750, 760, 770, and 600 preferably has an associated suspension system.

Figure 9A:
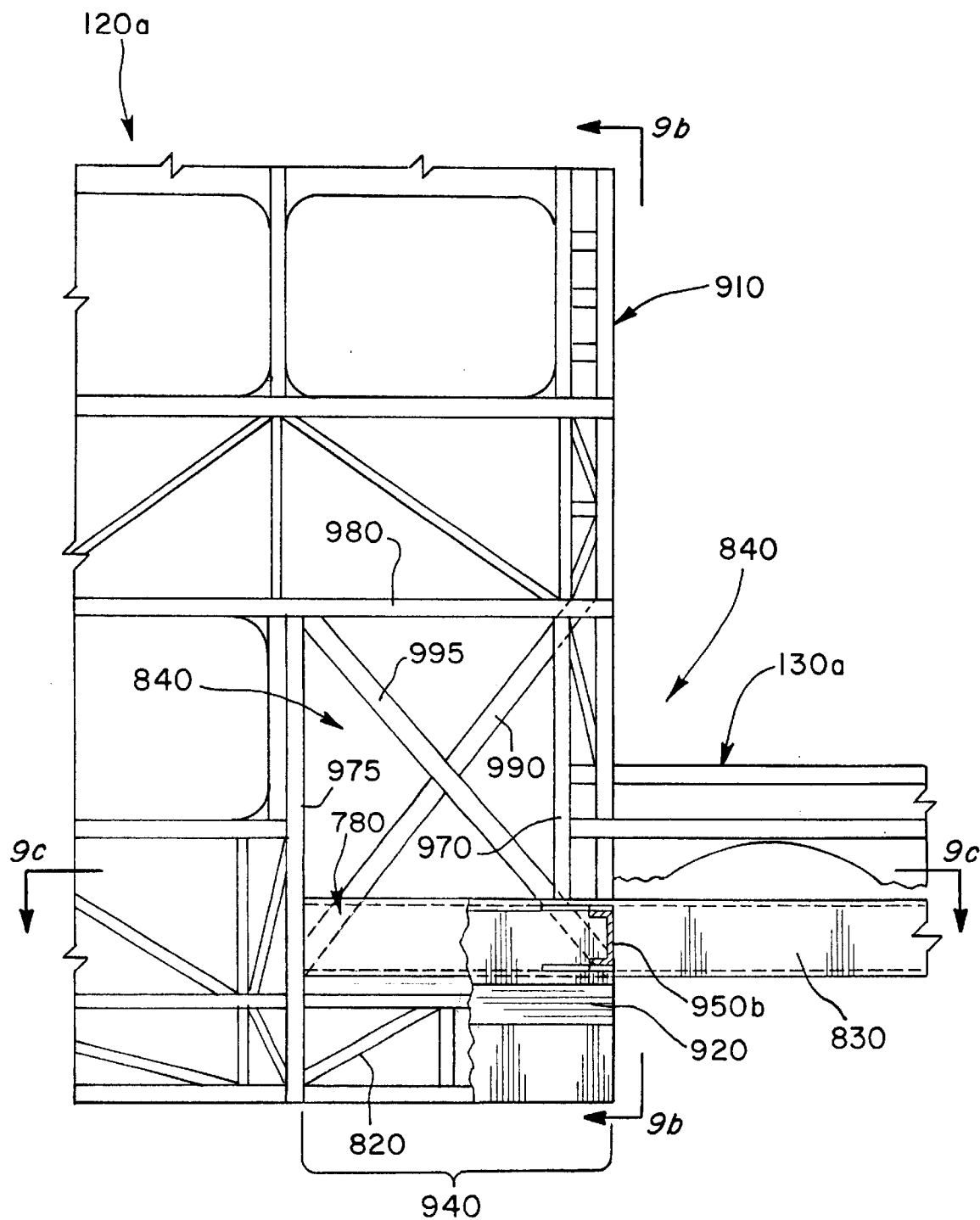
FIG. 9(a) is a detailed side view of the three-dimensional region between the coach spine and the truck frame of the vehicle shown in FIG. 5.

10. Connection of the Coach Spine to the Truck Frame. FIGS. 9(*a*) through 9(*d*) show the connection of the coach spine 820 to the truck frame 830 (i.e., the three-dimensional region 840). The coach spine 820 is shown supporting the passenger area 120*a* and extending to the rear wall 910 of the passenger area. The truck frame 830 is shown beneath the freight area 130*a* and extending through the rear wall 910 and overlapping at 940 with the coach spine 820. In the preferred embodiment, a plate 920 (FIG. 9*a*) extends along the overlap 940 between the truck frame 830 and the coach spine 820 and connects the truck frame 830 to the coach spine 820 (e.g., bolted and welded thereto). A first cross member 930 (FIG. 9(*c*)) extends across the front portion 780 of the truck frame 830 and connects the coach spine 820 to the truck frame 830 and to the rear wall 910 and the upper deck of the passenger area as illustrated in FIGS. 9(*a*) and 9(*d*). A three-part cross member 950*a–c* extends across the truck frame 830 between the side walls 960*a,b* along the rear wall 910 within the passenger area 120*a* and connects the coach spine 820 to the truck frame 830 and to the rear wall 910 and side walls 960*a,b* (FIG. 9(*c*)). Preferably, the rear wall 910 of the passenger area 120*a* is also structurally enhanced to transfer load stresses between the passenger area 120*a* and the freight area 130*a*.

Figure 9B:
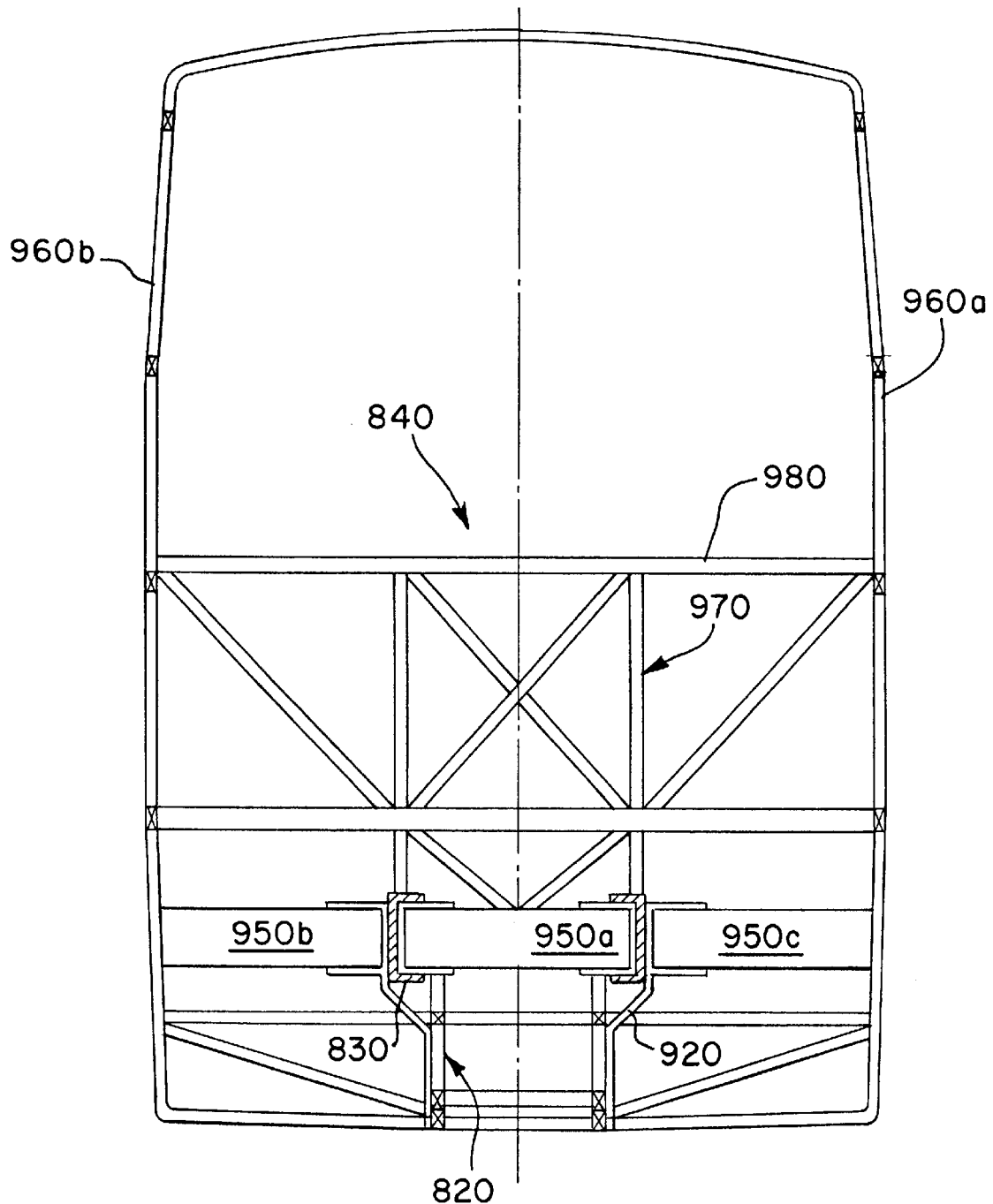
FIG. 9(b) is a cross sectional view of the three-dimensional region taken along line 9b—9b of FIG. 9(a).

In addition to the above described connection between the truck frame 830 and the coach spine 820, the three-dimensional region 840 preferably also includes rear support members 970 (FIGS. 9*a*, 9*b*) connected to the truck frame 830 and the rear wall 910 and front support members 975 (FIGS. 9(*a*) and 9(*d*)) at the forward portion 780 of the truck frame 830. The rear support members 970 extend vertically upward from the truck frame 830 to the second level 980 (e.g., the floor structure of the second level in a double-decker passenger area) and are further connected to the rear wall 910 and to the second level 980. The front support members 975 are also connected to the truck frame 830 at the first cross member 930 and extend vertically upward from the truck frame 830 to the second level 980 where the front support members 975 are further connected to the second level 980 and over to the side walls 960*a,b*. Preferably, diagonal support members add further support to the three-dimensional region 840. Specifically, a first diagonal support member 990 (FIG. 9(*a*)) is connected to the truck frame 830 at the first cross member 930 and extends diagonally upward to the second level 980 above the second cross member 950*a*. A second diagonal support member 995 is connected to the truck frame 830 at the second cross member 950*a* and extends diagonally upward to the second level 980 above the first cross member 930. Preferably, the first and second diagonal support members 990, 995 crisscross one another substantially at the respective midpoints (i.e., at or near the midpoints) as shown in FIG. 9(*a*). As such, the truck frame 830 and the coach spine 820 are connected to one another and to the passenger area 120*a* (i.e., in the three-dimensional region 840 defined above) so that when a load is placed on the freight area 130*a*, the forces (explained in more detail below) are distributed over the truck frame 830 and into the passenger area 120*a*.

It is to be expressly understood that the above description of the three-dimensional region 840 is a preferred embodiment, however, other structural connections are possible under the teachings of the present invention. For example, additional or fewer support and cross members can be used and/or members can be integrally formed and need not be distinct components. Alternatively, in other embodiments, the three-dimensional region 840 need not be within the passenger area 120*a* or can be partially within and partially behind the passenger area 120*a*. In such an embodiment, for instance, the truck frame 830 and the coach spine 820 could overlap behind the passenger area 120*a* beneath the freight area 130*a*. In yet another embodiment (not shown), support members can extend diagonally from the freight area 130*a* (e.g., the truck frame above the drive axle 760) to connect at the rear wall 910. Any number of designs can be used to connect the truck frame 830 in a three-dimensional region 840 to the coach spine 820 and provide the structural integrity required to properly distribute the forces acting on the vehicle 100*a* (as explained in more detail below) while maintaining the comfort of the ride for passengers in the passenger area 120*a*.

Figure 9D:
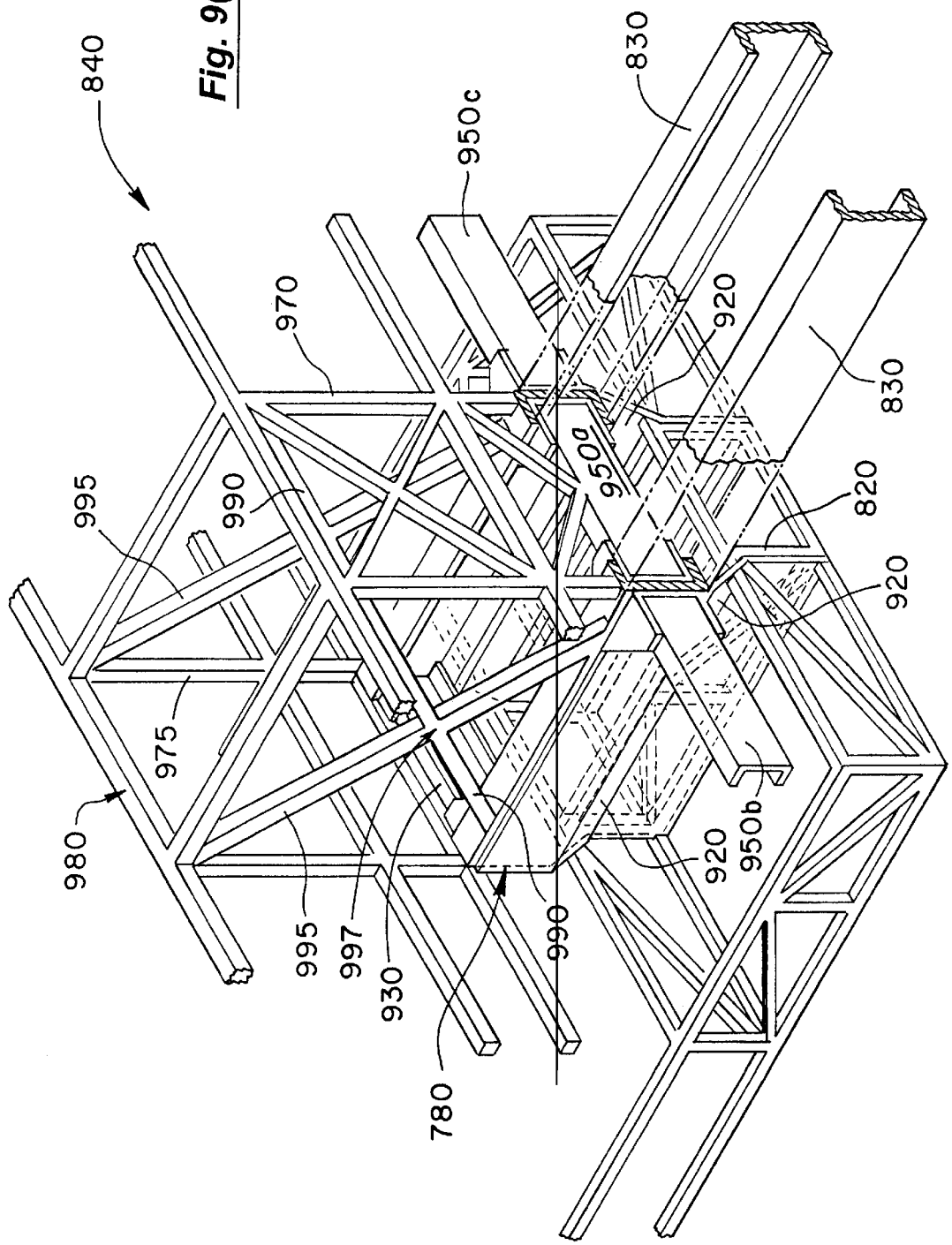
FIG. 9(d) is a perspective view of the three-dimensional region shown in FIG. 9(a).

The three-dimensional region 840 can be described in summary with respect to FIG. 9(*d*) as follows. The truck frame 830 beneath the freight area 130*a* extends through the rear wall 910 (see FIG. 9(*a*)) of the passenger area 120*a* and overlaps (i.e., 940 in FIG. 9(*a*)) the coach spine 820 and is interconnected along the overlap 940 by a plate 920. A first cross member 930 extends across the front portion 780 (FIG. 9(*c*)) of the truck frame 830 and connects the coach spine 820 to the truck frame 830. In addition, a three-part cross member 950*a,b,c* extends across the truck frame 830 between the side walls 960*a,b* (FIG. 9(*c*)) along the rear wall 910 (FIG. 9(*a*)) within the passenger area 120*a* and connects the coach spine 820 to the truck frame 830 and to the rear wall 910 and side walls 960*a,b*, respectively. The rear support members 970 are connected to the truck frame 830 at the rear wall 910 and extend vertically upward to the second level 980 and are further connected to the rear wall 910 and to the second level 980 and also can extend to the sidewalls 960*a,b*. Similarly, front support members 975 are connected to the truck frame 830 at the first cross member 930 and extend vertically upward to the second level 980 and are further connected to the second level 980. First and second diagonal support members 990, 995 are connected to the truck frame 830 near the first and second cross members 930, 950a, respectively, and extend diagonally upward to connect to the second level 980 above the second and first cross members 950a, 930 respectively. As shown in FIG. 9(d), the first and second diagonal support members 990, 995 crisscross one another at the respective midpoints (e.g., at 997). Thus, the truck frame 830 and the coach spine 820 are integrally connected so that when a load (e.g., container 150) is placed on the freight area 130a, it is distributed over the truck frame 830 and into the passenger area 120a.

11. Illustration of Force Distribution. FIGS. 16(a)–(c) illustrate the distribution of forces over the vehicle 100a under various loadings. In FIG. 10(a), the freight area 130a is unloaded. Downward forces 1100, 1110, and 1120 due to the weight of the vehicle 100a (and passengers, luggage, etc.) act on the front axle 750, drive axle 760, and tag axle 770 (and associated wheels), respectively. These forces are relatively small when the freight area 130a is unloaded, and therefore the retractable axle 600 need not be extended. However, retractable axle 600 can be extended even when the freight area 130a is empty to vary the traction of the vehicle 100a if necessary (e.g., on steep or snow-covered roads).

In FIG. 10(b), a partial load (e.g., freight 620) has been placed on the freight area 130a (e.g., the vehicle 100a is being loaded or has unloaded part of its freight). The forces 1100, 1110, and 1120 continue to act at the respective positions on the vehicle 100a, however, these forces have begun to increase due to the partial load placed on the freight area 130a. Initially, the retractable axle 600 need not be extended as these forces are not significant enough to require the additional support from the retractable axle 600. Once again, however, the retractable axle 600 can be extended if necessary.

In FIG. 10(c), the freight area 130a has been fully loaded to such an extent where the forces 1100, 1110, and 1120 have become too great for the axles 750, 760, and 770 to safely handle alone. Therefore, preferably before exceeding a predetermined load limit (i.e., based on structural, safety and government regulatory considerations), the retractable axle 600 (and associated wheels) is lowered to its extended position and thus bears at least part of the load (e.g., force 1130 acting on the retractable axle 600) and reducing the forces 1100, 1110, and 1120 on the other axles. As such, the retractable axle 600 increases the freight hauling capacity of the vehicle 100a (preferably up to 20,000 lbs).

Table II illustrates the estimated weight (in pounds) of the vehicle 100a (i.e., "Gross") and on each axle under various loading conditions.

TABLE II

| Load | Gross | Front | Drive | Tag | Lift |
|---|---|---|---|---|---|
| No passengers/No freight | 28,586 | 14,496 | 15,021 | −931 | 0 |
| Passengers/No freight | 34,092 | 18,728 | 17,840 | −2476 | 0 |
| Maximum Load (retractable axle extended) | 54,092 | 13,995 | 18,022 | 9,959 | 12,116 |

In addition, forces acting on the three-dimensional region 840 between the truck frame 830 and the coach spine 820 (see FIG. 9(d)) are also shown in FIGS. 10(a)–(c). These forces include a horizontal force 1200 (caused by forward motion of the vehicle 100a), twisting force 1210 (caused by the vehicle 100a turning in either direction), and bending moment 1220 (caused by the weight of the passenger area 120a and the freight area 130a and associated loads). The three-dimensional region 840 and the axle and wheel arrangement described above, including the retractable axle 600 (i.e., lowering the retractable axle 600 results in a force variation due to a changed weight distribution on the axles), maintain the structural integrity of the vehicle 100a under the various loading conditions illustrated above and driving conditions (e.g., uphill, around turns, etc.) so that the connection between the coach spine 820 and the truck frame 830 does not weaken.

It is to be expressly understood that the illustration in FIGS. 10(a) through 10(c) and the values given in Table II are merely illustrative of a preferred embodiment of the present invention and are not intended to limit the present invention. In addition, more axles and wheels can be provided and variously arranged. Likewise, additional retractable axles can be used in other embodiments, whereas vehicles carrying lighter loads need not have a retractable axle at all (see the embodiment of FIG. 1).

Figure 11:
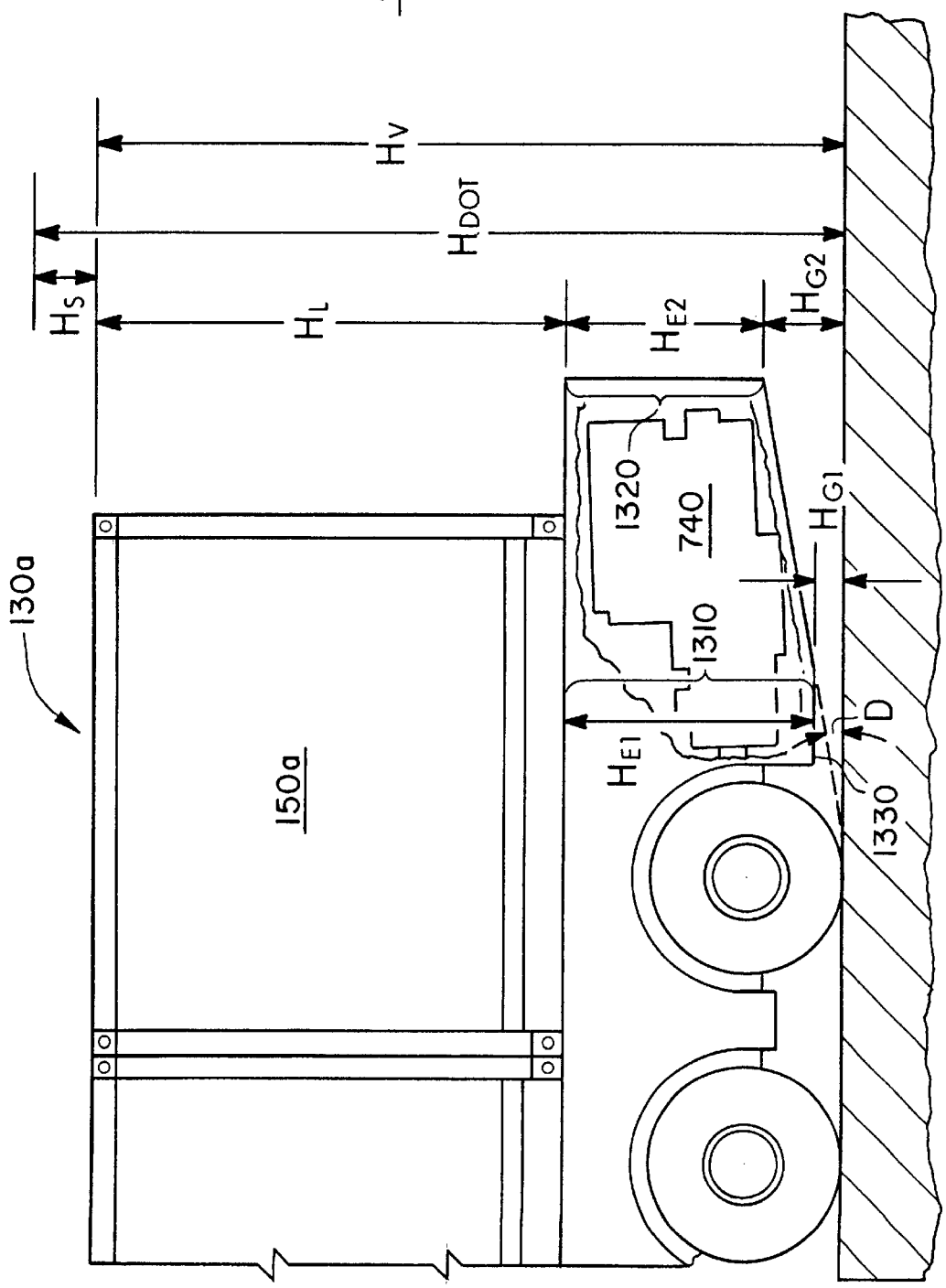
FIG. 11 is a side view of the rear portion of the vehicle shown in FIG. 6(a) illustrating the engine position.

12. Engine Position. A conventional engine 740 (e.g., Detroit Diesel Series 60) is preferably positioned at the rear portion of the vehicle 100a beneath the freight area 130a (FIGS. 7 and 11). In such an embodiment, the engine 740 is disposed between a forward region 1310 and a rearward region 1320. The forward region 1310 is defined by a ground clearance height $H_{G1}$ and a vehicle height $H_V$ and the rearward region 1320 is defined by the departure angle D and the vehicle height $H_V$. That is, the vehicle 100a has a first predetermined ground clearance $H_{G1}$ (i.e., the distance from the ground to the lower-most part 1330 of the coach body) based on a variety of factors such as government regulations, gross vehicle weight, desired handling characteristics, etc. In addition, the rear portion of the vehicle 100a preferably tapers upward from the lower-most part of the coach body toward the end portion of the coach body along the departure angle D. The departure angle D is based on a variety of factors including government regulations, overall vehicle length, etc., and provides sufficient clearance when the vehicle 100a encounters changes in the road grade. A second predetermined ground clearance $H_{G2}$ (i.e., the distance from the ground to the bottom 1330 of the vehicle 100a along the departure angle D) can be determined geometrically based on the departure angle D. These two points (i.e., defined by $H_{G1}$ and $H_{G2}$) are the lower limits within which the engine 740 can be placed while maintaining the desired ground clearance levels $H_{G1}$, $H_{G2}$ in the rear portion of the vehicle 100a. The upper limits can be determined based on the vehicle height $H_V$ (i.e., including the vehicle, and associated ground clearances), and the height of any freight loaded thereon, $H_L$. The overall vehicle height $H_V$ is no greater than the maximum allowable vehicle height $H_{DOT}$ (i.e., based on government regulations and/or desired clearances), and is preferably lower (i.e., by a desired factor of safety $H_S$). Hence, the height of the engine 740 in the forward region 1310 (i.e., $H_{E1}$) and in the rearward region 1320 (i.e., $H_{E2}$) preferably does not exceed the vehicle height $H_V$ less the desired ground clearance levels $H_{G1}$, $H_{G2}$, less the desired height of the freight loaded thereon (i.e., $H_L$).

Under the above described embodiment, the forward region can be defined mathematically such that:

$$H_{E1} \approx H_V - H_L - H_{G1}$$

where:

$H_{E1}$ is the height of the engine in the forward region, $H_V$ is the vehicle height, $H_L$ is the height of the load placed on said freight area, $H_{G1}$ is the ground clearance height in the forward region. Likewise, the rearward region 1320 can be defined mathematically such that:

$$H_{E2} \approx H_V - H_L - H_{G2}$$

where:

$H_{E2}$ is the height of the engine in the rearward region, $H_V$ is the vehicle height, $H_L$ is the height of the load placed on said freight area, $H_{G2}$ is the ground clearance height in the rearward region.

It is to be expressly understood that the above defined mathematical expressions are intended to be illustrative of the limits within which the engine 740 is positioned in the rear portion of the vehicle 100*a* and other mathematical expressions can be used to define the positioning of the engine in the rear portion of the vehicle 100*a*. In addition, when the rear portion of the vehicle 100*a* is parallel to the ground (or the engine 740 is positioned parallel to the ground), the vertical clearance of the forward region 1330 and the rearward region 1320 will be equal to one another and hence separate equations need not be used to calculate the vertical clearance. Furthermore, the engine 740 need not be positioned precisely at the upper and lower calculated limits, and these dimensions are intended only as a guide used to position the engine 740 in the rear portion of the vehicle 100*a*. For example, where a smaller engine is used, the engine 740 can be positioned at any suitable position between the calculated upper and lower limits and at any desired angle therein. In yet other embodiments, the engine 740 need not be positioned at the rear portion of the vehicle 100*a*, and can instead be positioned beneath the passenger area 120*a*, at the three-dimensional region 840 of the truck frame 830 and the coach spine 820, or any other suitable position on the vehicle 100*a*.

The engine 740 is fastened directly to the truck frame 830 using any suitable fasteners. That is, as shown in FIG. 7 the engine 740 preferably mounts at 741*a* and 741*b* (and on opposing sides, not shown) to the truck frame at 741*c* and 741*d*, respectively. However, it is to be expressly understood that additional or fewer engine mounts can be used and positioned at any suitable position on the engine 740 and truck frame 830. Indeed, engine mounts 741 can be formed as part of the engine 740 or the truck frame 830. Alternatively, an engine carriage (not shown) can be positioned at the rear portion of the vehicle 100*a* (e.g., fastened to the truck frame and positioned according to the above described equations) and the engine 740 is then fastened to the engine carriage. The engine carriage would thus provide additional support and protection for the engine 740. Once the engine 740 has been positioned (e.g., using the above described equations), the engine 740 can be situated therein in any suitable manner that provides the requisite power to the drive axle 760.

Situating the engine 740 and making the necessary adjustments (e.g., aligning the drive shaft 762, providing the desired torque and power, etc.) within the above-described limits is within the scope of one skilled in the art.

13. Examples of Use. The flexibility of the vehicle 100*a* (i.e., that it can carry passengers and different loads with little or no modification) allows the vehicle 100*a* to operate in many different passenger and freight markets in different manners. The following are examples and are not meant to limit the teachings of the present invention in any way.

In one example, freight is shipped between destinations without interrupting passenger scheduling. In this example, the vehicle 100*a* first stops at a freight staging area in Destination City A where it is loaded with an intermodal container destined for Destination City C. The vehicle 100*a* then proceeds to the passenger station in Destination City A where passengers board (i.e., into passenger area 120*a*). The vehicle 100*a* travels to Destination City B as an express coach. Upon arriving in Destination City B, the passengers disembark at the Destination City B passenger station and the vehicle 100*a* proceeds to the Destination City B rail yard. The intermodal container 150*a* is removed from the vehicle 100*a* and loaded onto a freight train bound for Destination City C. The vehicle 100*a* can either be reloaded at the rail yard or proceed to a freight staging area in Destination City B to be reloaded (i.e., with an intermodal container destined for Destination City A) before returning to the Destination City B passenger station to pick up passengers destined for Destination City A. As such, the passenger scheduling is unaffected by the delivery of freight (i.e., passengers do not wait for freight to be loaded/unloaded). In addition, the operator of vehicle 100*a* is compensated for the transportation of the intermodal container 150*a* from Destination City A to Destination City B, permitting the operator to reduce passenger fares between Destination City A and Destination City B while consistently maintaining the route's profitability. In this example, the vehicle 100*a* can also operate with a multiple driver team and operate virtually non-stop (i.e., except to refuel) along the route, providing a low cost alternative to flying or rail transportation for passengers. A gallery in the passenger area 120*a* can provide refreshments for the passengers between refueling stops.

In another example, routes are expanded to service passengers in rural or outlying areas. That is, the vehicle 100*a* departs from Metropolitan City with packages and passengers, if any, and travels to Outlying Towns A, B, and C. The vehicle 100*a* arrives in Outlying Town A and stops at the local Post Office to unload mail. The vehicle 100*a* may also stop at a local warehouse to deliver and/or pick up additional packages before or after stopping at the local passenger station to pick up and/or drop off passengers. It is to be understood that the freight can be picked up first, then the passengers, in reverse where the passengers are picked up first and then the freight, or the passengers and freight can be picked up and dropped off simultaneously. The vehicle 100*a* then continues to Outlying Town B and Outlying Town C, making one or more stops at each town to load and unload packages and passengers, if any. Passengers may also embark/disembark at any of the stops (e.g., the Post Office) and a separate passenger station need not be provided. In this example, although passengers must wait at each stop for packages to be loaded and/or unloaded, the passengers now have a transportation option between these outlying areas that may not have existed previously. In addition, the operator of the vehicle 100*a* makes a profit from transporting packages to these areas whether or not there are any passengers on a given day.

It is understood that the above examples are merely illustrative of uses for the vehicle 100*a*, and other uses are contemplated under the teachings of the present invention.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

We claim:

1. An intermodal coach comprising:
   a forward double-decker passenger area;
   a flatbed area rearwardly adjacent said double-decker passenger area;
   a chassis supporting both said double-decker passenger area and said flatbed area;
   an intermodal container;
   attachments connected to said flatbed area, said attachments removably securing said intermodal container to said flatbed area of said intermodal coach.

2. The intermodal coach of claim 1 wherein said intermodal container is wrapped in a cover.

3. The intermodal coach of claim 1 wherein said intermodal container has advertising displayed thereon.

4. The intermodal coach of claim 1 wherein the top of said passenger area is substantially flush with the top of said intermodal container when said intermodal container is loaded on said flatbed area.

5. The intermodal coach of claim 1 wherein the sides of said intermodal container are substantially flush with the sides of said passenger area when said intermodal container is loaded on said flatbed area.

6. The intermodal coach of claim 1 further comprising a pancake engine, said pancake engine positioned beneath said flatbed area.

7. The intermodal coach of claim 1 further comprising an engine, said engine positioned beneath said flatbed area.

8. The intermodal coach of claim 1 further comprising four attachments, each attachment connected to one corner of said flatbed area.

9. The intermodal coach of claim 1 further comprising eight attachments connected to said flatbed area.

10. The intermodal coach of claim 1 wherein said chassis further has a frame, an intermodal support, and a bus suspension.

11. A vehicle carrying passengers and freight comprising:
    a passenger area having a plurality of individual passenger seats to carry said plurality of passengers and at least one passenger luggage compartment;
    a freight area rearward of said passenger area;
    a forward frame supporting said passenger area; and
    a rearward frame supporting said freight area, said rearward frame said forward frame, said passenger area, and said freight area rigidly connected in a three-dimensional region extending above said freight area and into said passenger area in order to support both said passenger area and said freight area.

12. The vehicle of claim 11 wherein said forward frame is a partial coach spine and said rearward frame is a partial truck frame.

13. The vehicle of claim 11 further comprising a secondary frame connected to said rearward frame to support a load when placed thereon.

14. The vehicle of claim 11 further comprising at least one freight container removably connected to said freight area.

15. The vehicle of claim 14 wherein said at least one freight container is an intermodal container.

16. The vehicle of claim 14 wherein said at least one freight container is an airline belly container.

17. The vehicle of claim 14 wherein said freight container is removably connected to said freight area with interlocking attachments.

18. The vehicle of claim 14 wherein the top of said passenger area is substantially flush with the top of said freight container.

19. The vehicle of claim 14 wherein the sides of said freight container are substantially flush with the sides of said passenger area.

20. The vehicle of claim 11 wherein said passenger area has at least two levels, each said level having said passenger seats therein.

21. The vehicle of claim 11 further comprising an overload warning system signaling the driver when a load placed on said freight area exceeds a predetermined load limit.

22. The vehicle of claim 11 further comprising a suspension system supporting said passenger area and said freight area, said suspension system providing a consistently comfortable ride to passengers in said passenger area when there is no load, a partial load, and a full load.

23. The vehicle of claim 22 wherein said suspension system further includes air springs.

24. The vehicle of claim 23 wherein said air springs are adjustable based on a gross vehicle weight.

25. A vehicle comprising:
    a passenger area having two passenger levels and a passenger luggage compartment;
    a plurality of passenger seats on said two passenger levels of said passenger area;
    a freight area rearward of said passenger area;
    a suspension system having adjustable air springs, said suspension system supporting said passenger area and said freight area and providing a consistently comfortable ride to passengers in said passenger area when loaded to varying degrees;
    a coach spine beneath said passenger area; and
    a truck frame beneath said freight area, said truck frame, said coach spine, said passenger area, and said freight area integrally connected together to distribute forces under various loadings on the freight area.

26. A vehicle comprising:
    a passenger area, said passenger area having a ceiling level, a rear wall and opposing side walls;
    a forward frame supporting said passenger area and extending to said rear wall;
    a freight area, said freight area having a rearward frame overlapping said forward frame;
    a three-dimensional region connecting said forward frame, said rearward frame, said passenger area, and said freight area extending through said rear wall.

27. The vehicle of claim 26 wherein said three-dimensional area further comprises:
    a first cross member extending across the front portion of said rearward frame and connecting said forward frame to said rearward frame; and
    a second cross member extending across said rearward frame at the rear wall, said second cross member connecting said forward frame to said rearward frame and to said rear wall, said load when placed on said freight area being distributed over said rearward frame and into said passenger area.

28. The vehicle of claim 27 wherein said second cross member is a three-part member extending across the rear wall between said opposing side walls and connected to the rear and side walls.

29. The vehicle of claim 26 wherein said forward frame is a coach spine and said rearward frame is a truck frame.

30. The vehicle of claim 26 wherein said rearward frame extends through said rear wall and overlaps said forward frame within said passenger area thereby reducing the forces at the connection between said forward frame and said rearward frame by distributing at least part of the load on said freight area over said passenger area.

31. The vehicle of claim 30 wherein said rearward frame extends into said passenger area and overlaps with said forward frame for substantially forty to fifty inches from said rear wall.

32. A vehicle comprising:
a passenger coach area mounted to a coach spine;
a freight area to support a load when placed thereon, said freight area and said coach spine integrally connected to said passenger coach and said coach spine area;
a front axle beneath the front portion of said passenger coach area;
at least one rear axle beneath the rear portion of said freight area; and
a retractable axle beneath said freight area and between said coach spine and said at least one rear axle, said retractable axle movable between a retracted position and an extended position,
said passenger coach area and said freight area supported by said front axle and said at least one rear axle when said retractable axle is in said retracted position,
said passenger coach area and said freight area supported by said front axle, said at least one rear axle, and said retractable axle when said retractable axle is in said extended position to increase the freight hauling capacity of said vehicle.

33. The vehicle of claim 32 further comprising an air spring suspension system.

34. The vehicle of claim 32 further comprising an air lift mechanism to move said retractable axle between said extended position and said retracted position.

35. The vehicle of claim 32 wherein said retractable axle is moved to said extended position to provide additional traction for said vehicle.

36. The vehicle of claim 32 wherein said retractable axle is moved to said extended position when said load meets and exceeds a predetermined weight, said retractable axle thereby bearing at least part of said load.

37. The vehicle of claim 32 wherein said at least one rear axle further comprises a pair of axles.

38. The vehicle of claim 37 wherein said pair of axles further comprises a drive axle and a tag axle behind said drive axle.

39. The vehicle of claim 37 wherein said drive axle is supported by a trailing arm suspension.

40. A vehicle comprising:
a passenger coach area mounted to a coach spine;
a freight area to support a load when placed thereon, said freight area and said coach spine integrally connected to said passenger coach area;
an air spring suspension system to provide a consistently comfortable ride to said passenger coach area;
a front axle beneath the front portion of said passenger coach area;
a drive axle supported by a trailing arm suspension;
a tag axle behind said drive axle, said drive axle and said tag axle positioned beneath the rear portion of said freight area;
a retractable axle beneath said freight area and between said coach spine and said drive axle; and
an air lift mechanism to move said retractable axle between a retracted position and an extended position;
said passenger coach area and said freight area supported by said front axle, said drive axle and said tag axle when said retractable axle is in said retracted position,
said passenger coach area and said freight area supported by said front axle, said drive axle, said tag axle, and said retractable axle when said retractable axle is in said extended position to increase the freight hauling capacity of said vehicle.

41. A vehicle comprising:
a passenger coach area having passenger seats and a rear wall;
a freight area to support a load when placed thereon, said freight area integrally connected in a three-dimensional region into said rear wall of said passenger coach area so as to distribute forces from said load over said three-dimensional region;
a front set of wheels beneath the front portion of said passenger area;
at least one rear set of wheels beneath the rear portion of said freight area; and
an engine beneath the rear portion of said freight area and rearward of said at least one rear set of wheels.

42. The vehicle of claim 41 wherein said forces include at least a vertical force, a horizontal force, a bending moment, and a rotational force.

43. The vehicle of claim 41 wherein said at least one rear set of wheels further comprises:
a pair of dual drive wheels;
a pair of tag wheels behind said pair of dual drive wheels.

44. The vehicle of claim 41 further comprising a set of retractable wheels movable between a retracted position and an extended position.

45. A vehicle comprising:
a passenger coach having passenger seats and a rear wall area;
a freight area to support a load when placed thereon, said freight area integrally connected into a three-dimensional region of said rear wall of said passenger area;
a front set of wheels beneath the front portion of said passenger area;
a pair of dual drive wheels beneath the rear portion of said freight area;
a pair of tag wheels behind said pair of dual drive wheels; and
a pair of retractable wheels movable between a retracted position and an extended position, said retractable wheels bearing at least part of the load on said freight area when said retractable wheels are in the extended position.

46. A vehicle comprising:
a freight area to support a load when placed thereon;
an engine under the rear portion of said freight area, said engine disposed between a forward region and a rearward region,
said forward region defined by a ground clearance height and a vehicle height such that:

$$H_{E1} \approx H_V - H_L - H_{G1}$$

where:

$H_{E1}$ is the height of the engine in the forward region,
$H_V$ is the vehicle height,
$H_L$ is the height of the load placed on said freight area,
$H_{G1}$ is the ground clearance height in the forward region;

said rearward region defined by the departure angle and the vehicle height such that:

$$H_{E2} \approx H_V - H_L - H_{G2}$$

where:

$H_{E2}$ is the height of the engine in the rearward region,
$H_V$ is the vehicle height,
$H_L$ is the height of the load placed on said freight area,
$H_{G2}$ is the ground clearance height in the rearward region.

47. The vehicle of claim 46 wherein the vehicle height is less than a maximum predetermined vehicle height.

48. The vehicle of claim 46 wherein the vehicle height includes the load on said freight area.

49. The vehicle of claim 46 wherein the the ground clearance height in the forward region HG1 and the ground clearance height in the rearward region HG2 are defined at least in part by a departure angle D.

* * * * *